(12) United States Patent
Katoh et al.

(10) Patent No.: US 7,042,535 B2
(45) Date of Patent: May 9, 2006

(54) OPTICAL DISPLAY SYSTEM AND OPTICAL SHIFTER

(75) Inventors: Hiromi Katoh, Nara (JP); Koichi Miyachi, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/357,406

(22) Filed: Feb. 4, 2003

(65) Prior Publication Data

US 2003/0147015 A1    Aug. 7, 2003

(30) Foreign Application Priority Data

Feb. 5, 2002 (JP) .............................. 2002-027955
Dec. 9, 2002 (JP) .............................. 2002-356695

(51) Int. Cl.
    *G02F 1/1347* (2006.01)
(52) U.S. Cl. .................. 349/77; 349/119; 349/193; 349/5
(58) Field of Classification Search ................ 349/117, 349/119, 193, 5, 15, 77; 359/494, 495, 639; 345/32, 56
    See application file for complete search history.

(56) References Cited

U.S. PATENT DOCUMENTS

| | | | |
|---|---|---|---|
| 3,825,348 A * | 7/1974 | Nomarski et al. ........... 356/484 |
| 4,461,543 A * | 7/1984 | McMahon ................... 359/320 |
| 5,161,042 A | 11/1992 | Hamada |
| 5,490,006 A | 2/1996 | Masumoto et al. |
| 5,506,701 A | 4/1996 | Ichikawa |
| 5,969,832 A | 10/1999 | Nakanishi et al. |
| 6,061,103 A | 5/2000 | Okamura et al. |
| 6,222,672 B1 | 4/2001 | Towler et al. |
| 6,384,816 B1 * | 5/2002 | Tabata ......................... 345/204 |
| 6,972,809 B1 * | 12/2005 | Nakanishi ....................... 349/5 |
| 2003/0090597 A1 | 5/2003 | Katoh et al. |
| 2003/0095092 A1 * | 5/2003 | Kume et al. .................. 345/87 |
| 2005/0105016 A1 * | 5/2005 | Kurihara et al. .............. 349/96 |

FOREIGN PATENT DOCUMENTS

JP            59-230383 A        12/1984

(Continued)

OTHER PUBLICATIONS

Shimizu, Jeffrey A., "Single Panel Reflective LCD Optics," IDW '99, Proceedings of The Sixth International Display Workshops, Dec. 1-3, 1999, pp. 989-992, Japan.

(Continued)

*Primary Examiner*—Toan Ton
*Assistant Examiner*—Tai Duong
(74) *Attorney, Agent, or Firm*—Birch, Stewart, Kolasch & Birch, LLP

(57) ABSTRACT

An optical display system includes: a light source; a display panel including multiple pixel regions, each of which can modulate light; and an optical shifter, which is disposed so as to receive an outgoing light ray of the display panel and optically shift an image on the display panel on a frame-by-frame basis. The optical shifter includes a first element for selectively changing the polarization direction of the outgoing light ray of the display panel, and a second element, which exhibits one of multiple different refractive indices according to the polarization direction of an incoming light ray. A polarization corrector, which changes the polarization direction of the outgoing light ray of the display panel into a direction that is either parallel to, or perpendicular to, a direction in which the image is shifted, is provided between the display panel and the optical shifter.

7 Claims, 17 Drawing Sheets

FOREIGN PATENT DOCUMENTS

| | | |
|---|---|---|
| JP | 4-60538 A | 2/1992 |
| JP | 5-249318 A | 9/1993 |
| JP | 6-222361 A | 8/1994 |
| JP | 7-5421 A | 1/1995 |
| JP | 07-284113 A * | 10/1995 |
| JP | 9-214997 A | 8/1997 |
| JP | 11-298920 A | 10/1999 |
| WO | WO 01/96932 A1 | 12/2001 |

OTHER PUBLICATIONS

Pancharatnam, S., "Achromatic Combinations of Birefringent Plates," The Proceedings of the Indian Adademy of Sciences, 1955, pp. 130-136 and 137-144, vol. XLI, No. 4, Sec. A.

* cited by examiner

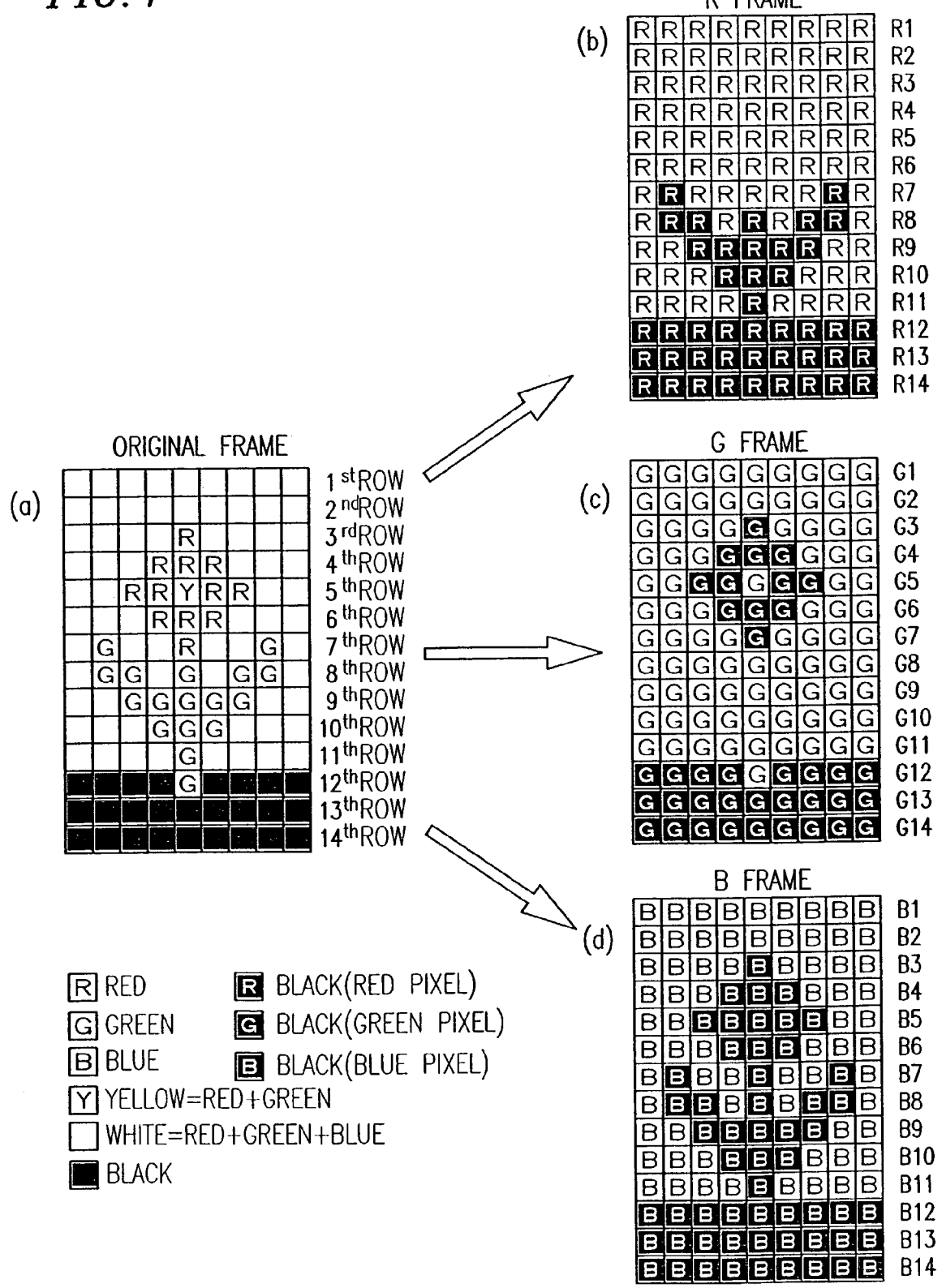

OPTICAL DISPLAY SYSTEM AND OPTICAL SHIFTER

BACKGROUND OF THE INVENTION

1. Field of the Invention

The present invention generally relates to an optical display system, and more particularly relates to a single-panel projection type optical display system, which can conduct a display operation in full colors with a single display panel and without using color filters. The present invention is effectively applicable for use in a compact projection type color liquid crystal TV system or information display system.

2. Description of the Related Art

A conventional projection type optical display system that uses a liquid crystal display (LCD) panel will be described.

Such a projection type optical display system needs to be separately provided with a light source because the LCD panel itself emits no light. However, the projection type optical display system using an LCD panel is advantageous over a projection type optical display system using a CRT because the display system of the former type realizes a broader color reproducible range, has a smaller size and a lighter weight, and needs no convergence correction.

A projection type optical display system may conduct a full-color display operation either by a three-panel method (i.e., with three LCD panels used for the three primary colors) or by a single-panel method (i.e., with just one LCD panel used).

A three-panel projection type optical display system uses an optical system for splitting white light into three light rays representing the three primary colors of red (R), green (G) and blue (B) and three LCD panels for modulating the R, G and B light rays and thereby forming three image components. By optically superimposing the R, G and B image components one upon the other, the three-panel projection type optical display system can create an image in full colors.

The three-panel projection type optical display system can efficiently utilize the light that is radiated from a white light source but needs a complicated optical system and a greater number of components. Thus, the three-panel projection type optical display system is normally less advantageous than the single-panel projection type optical display system in respects of cost and size.

The single-panel projection type optical display system uses a single LCD panel including multiple R, G and B color filters that are arranged in a mosaic or striped pattern, and obtains a full-color image, displayed on the LCD panel, projected onto a projection plane (e.g., a screen) by a projection optical system. Such a single-panel projection type optical display system is described in Japanese Laid-Open Publication No. 59-230383, for example. The single-panel type uses only one LCD panel, and needs an optical system that is much simpler than that of the three-panel type. Thus, the single-panel method can be used effectively to provide a small-sized projection type optical display system at a reduced cost.

In the single-panel type that uses color filters, however, light is absorbed into the color filters. Accordingly, compared to a three-panel type that uses a similar light source, the brightness of the image decreases to about one-third in the single-panel type. In addition, one pixel should be displayed by a set of three pixel regions of the LCD panel that correspond to R, G and B, respectively. Thus, the resolution of the image also decreases to one-third as compared to the three-panel type.

One of possible measures against that decrease in brightness is using a brighter light source. However, the use of a light source with great power dissipation for a consumer electronic appliance is not preferred. Also, when color filters of absorption type are used, the light that has been absorbed into the color filters changes into heat. Accordingly, if the brightness of the light source is increased excessively, then not only the temperature of the LCD panel increases but also the discoloration of the color filters is accelerated. For that reason, to increase the utility value of the projection type optical display system, it is very important how to make full use of the given light.

To increase the brightness of an image displayed by a single-panel projection type optical display system, a liquid crystal display device for conducting a display operation in full colors without using any color filter was developed (see Japanese Laid-Open Publication No. 4-60538, for example). In this liquid crystal display device, the white light that has been radiated from a light source is split into R, G and B light beams by dielectric mirrors such as dichroic mirrors. The light beams are then incident onto a microlens array at mutually different angles. The microlens array is disposed on one side of an LCD panel so as to face the light source. These light beams that have been incident onto a microlens are transmitted through the microlens so as to be focused onto their associated pixel regions in accordance with the respective angles of incidence. Thus, the R, G and B split light beams are modulated by mutually different pixel regions and then used for a full-color display.

A display system, which uses transmissive hologram elements for the R, G and B light rays instead of the dielectric mirrors to utilize the light as efficiently as possible, is disclosed in Japanese Laid-Open Publication No. 5-249318. On the other hand, a display system, which includes a transmissive hologram element having a periodic structure defined by a pixel pitch and functioning as the dielectric mirrors or microlenses, is disclosed in Japanese Laid-Open Publication No. 6-222361.

The low resolution is another problem of the single-panel type. As for this problem, however, by adopting a field sequential technique, even just one LCD panel can achieve a resolution comparable to that of the three-panel type. The field sequential technique utilizes the phenomenon that when the colors of a light source are switched at too high a rate to be recognized by the human eyes, respective image components to be displayed time-sequentially have their colors mixed by an additive color mixture process. This phenomenon is called a "continuous additive color mixture process".

In a projection type optical display system for conducting a full-color display operation by the field sequential technique, a disk, made up of R, G and B color filters, is rotated at a high velocity that is equivalent to one vertical scan period of an LCD panel, and image signals, corresponding to the colors of the three color filters, are sequentially input to the driver circuit of the LCD panel. Thus, a synthesized image of three image components corresponding to the respective colors is recognized by human eyes.

In the display system of such a field sequential type, the R, G and B image components are displayed time-sequentially by each pixel of the LCD panel unlike the single-panel type. Thus, the resolution thereof is comparable to that of the three-panel type.

A projection type optical display system that irradiates mutually different regions of an LCD panel with the R, G and B light beams is disclosed as another display system of the field sequential type in IDW' 99 (pp. 989–992). In this display system, the white light that has been radiated from a light source is split by dielectric mirrors into R, G and B light beams, which will then irradiate mutually different regions of the LCD panel. The portions of the LCD panel to be irradiated with the R, G and B light beams are sequentially switched by rotating a cubic prism.

Furthermore, a projection type optical display system as disclosed in Japanese Laid-Open Publication No. 9-214997 uses a liquid crystal display device similar to that disclosed in Japanese Laid-Open Publication No. 4-60538 identified above. The display system also splits the white light into light beams in respective colors and then makes these light beams incident onto their associated pixel regions at mutually different angles by similar methods. To increase the optical efficiency and the resolution at the same time, this projection type optical display system divides each image frame into multiple image subframes time-sequentially and periodically switches the angles of incidence of the light beams every time one vertical scan period of the LCD panel passes.

However, the display systems disclosed in Japanese Laid-Open Publications Nos. 4-60538, 5-249318 and 6-222361 identified above can increase the brightness but the resolution thereof remains one-third of that of the three-panel type. The reason is that three spatially separated R, G and B pixels are used as a set to represent one pixel (or dot).

In contrast, the normal field-sequential type can increase the resolution to a level comparable to that of the three-panel type. However, the brightness of the image achieved by the normal field-sequential type is no more satisfactory than the conventional single-panel type.

In the display system disclosed in IDW' 99 on the other hand, the points of incidence of the R, G and B light beams should not overlap with each other. For that purpose, illuminated light having a very high degree of parallelism is needed. Accordingly, the optical efficiency also decreases as being constrained by the degree of parallelism of the illuminated light.

Thus, none of the conventional techniques described above can increase the brightness and the resolution at the same time or solve the problems of the single-panel type.

The applicant of the present application discloses a projection type optical display system, which should solve the problems described above, in Japanese Laid-Open Publication No. 9-214997. In the display system disclosed in Japanese Laid-Open Publication No. 9-214997, the angles of incidence of light beams entering an LCD panel need to be switched sequentially synchronously with the end of each vertical scan period of the LCD panel. In this display system, a special space needs to be provided between the LCD panel and the light source and two sets of hologram elements or mirrors need to be driven there to realize such switching.

Such a display system needs a plurality of movable members to switch the angles of incidence of the incoming light beams, thus requiring a complicated control. Also, each pixel of the LCD panel displays all three colors one after another, and color-by-color adjustment cannot be carried out by the LCD panel.

To overcome these problems, an optical display system disclosed in PCT Patent Application WO 01/96932 divides one frame into multiple subframes, shifts the optical path of the outgoing light ray of an LCD panel on a pixel-by-pixel basis every time subframes are switched, and synthesizes those light rays time-sequentially.

In the optical display system disclosed in PCT Patent Application WO 01/96932, the optical path of the outgoing light ray of the LCD panel needs to be shifted by an optical shifter. If the optical shifter includes a birefringent element, the light ray that is going to enter the optical shifter from the LCD panel should have a polarization direction that is either perpendicular to or parallel to the direction in which the optical path is shifted by the optical shifter. However, the R, G and B light rays should be incident onto the LCD panel at mutually different angles. Accordingly, the incoming light rays normally have a wide spread angle either horizontally or vertically. Thus, the LCD panel should be subjected to a 45 degree rubbing treatment to improve the display performance thereof. Nevertheless, when the optical shifter is used, the LCD panel can only be rubbed either horizontally or vertically for the reasons described above.

SUMMARY OF THE INVENTION

In order to overcome the problems described above, the present invention provides an optical display system that realizes the display of a bright and uniform image at a high resolution and that can effectively contribute to size and cost reduction.

The present invention also provides an optical shifter for such an optical display system.

An optical display system according to an embodiment of the present invention preferably includes a light source, a display panel and an optical shifter. The display panel preferably includes multiple pixel regions, each of which can modulate light. The optical shifter is preferably disposed so as to receive an outgoing light ray of the display panel and optically shift an image on the display panel on a frame-by-frame basis, and preferably includes a first element and a second element. The first element preferably selectively changes the polarization direction of the outgoing light ray of the display panel, while the second element preferably exhibits one of multiple different refractive indices according to the polarization direction of an incoming light ray. The display system preferably further includes a polarization corrector between the display panel and the optical shifter. The polarization corrector preferably changes the polarization direction of the outgoing light ray of the display panel into a direction that is either parallel to, or perpendicular to, a direction in which the image is shifted.

In one embodiment of the present invention, the display panel is preferably a liquid crystal display panel. The liquid crystal display panel preferably forms the image thereon by spatially modulating light having a polarization direction that is neither parallel to, nor perpendicular to, the direction in which the image will be shifted.

In this particular embodiment, the optical display system preferably further includes a second polarization corrector between the light source and the display panel. The second polarization corrector preferably receives light having a polarization direction that is either parallel to, or perpendicular to, the direction in which the image will be shifted, changes the polarization direction of the received light into the direction that is neither parallel to, nor perpendicular to, the direction in which the image will be shifted, and then passes the light to the liquid crystal display panel.

In another embodiment, each of the polarization correctors preferably includes at least one half-wave plate.

Specifically, the polarization corrector preferably includes multiple half-wave plates that are arranged in series on an optical path.

More particularly, the polarization corrector preferably includes a first half-wave plate and a second half-wave plate, which are arranged in this order such that the first half-wave plate is closer to the light source than the second half-wave plate is. The first half-wave plate preferably has a slow axis or fast axis that defines an angle of about 8.3 degrees to about 14.3 degrees either dextrorotatorily or levorotatorily with respect to the polarization axis of the outgoing light ray of the display panel. The second half-wave plate preferably has a slow axis or fast axis that defines an angle of about 30.8 degrees to about 36.8 degrees either dextrorotatorily or levorotatorily with respect to the polarization axis of the outgoing light ray of the display panel.

In an alternative embodiment, the polarization corrector may include a first half-wave plate and a second half-wave plate, which are stacked in this order such that the first half-wave plate is closer to the light source than the second half-wave plate is. In that case, the first half-wave plate preferably has a slow axis or fast axis that defines an angle of about 19.5 degrees to about 25.5 degrees either dextrorotatorily or levorotatorily with respect to the polarization axis of the outgoing light ray of the display panel. The second half-wave plate preferably has a slow axis or fast axis that defines an angle of about 87.0 degrees to about 93.0 degrees either dextrorotatorily or levorotatorily with respect to the polarization axis of the outgoing light ray of the display panel.

In still another embodiment, the polarization corrector may include a half-wave plate having multiple optic axes.

In yet another embodiment, the polarization corrector preferably includes a half-wave plate having multiple optic axes. The half-wave plate preferably substantially satisfies nz=(nx+ny)/2, where nx and ny are refractive indices of the half-wave wave plate in an in-plane direction and nz is a refractive index of the half-wave plate in a thickness direction.

An optical shifter according to another embodiment of the present invention preferably shifts periodically the optical path of an outgoing light ray of a display panel, which represents an image frame, and thereby selectively displaces the image frame to one of three or more locations that are arranged in line on the same plane and that are spaced apart from each other by at least one pixel pitch. The optical shifter preferably includes at least two pairs of elements that are arranged in series on the optical path of the outgoing light ray. Each pair preferably includes a first element and a second element, which are arranged in this order such that the first element is closer to the display panel than the second element is. The first element preferably selectively changes the polarization direction of the outgoing light ray of the display panel. The second element preferably exhibits one of multiple different refractive indices according to the polarization direction of incoming light. The optical shifter preferably further includes a polarization corrector. The polarization corrector is preferably disposed between the display panel and the first element that is closer to the display panel than any of the elements of the at least two pairs. The polarization corrector preferably changes the polarization direction of the outgoing light ray of the display panel into a direction that is either parallel to, or perpendicular to, a direction in which the optical path is shifted.

In one embodiment, the polarization corrector preferably includes at least one half-wave plate.

In another embodiment, the polarization corrector may include multiple half-wave plates that are arranged in series on the optical path.

In this particular embodiment, the polarization corrector preferably includes a first half-wave plate and a second half-wave plate, which are arranged in this order such that the first half-wave plate is closer to the display panel than the second half-wave plate is. The first half-wave plate preferably has a slow axis or fast axis that defines an angle of about 30.8 degrees to about 36.8 degrees either dextrorotatorily or levorotatorily with respect to the direction in which the optical path will be shifted. The second half-wave plate preferably has a slow axis or fast axis that defines an angle of about 8.3 degrees to about 14.3 degrees either dextrorotatorily or levorotatorily with respect to the direction in which the optical path will be shifted.

In an alternative embodiment, the polarization corrector may include a first half-wave plate and a second half-wave plate, which are stacked in this order such that the first half-wave plate is closer to the display panel than the second half-wave plate is. In that case, the first half-wave plate preferably has a slow axis or fast axis that defines an angle of about 64.5 degrees to about 70.5 degrees either dextrorotatorily or levorotatorily with respect to the direction in which the optical path will be shifted. The second half-wave plate preferably has a slow axis or fast axis that defines an angle of about 132.0 degrees to about 138.0 degrees either dextrorotatorily or levorotatorily with respect to the direction in which the optical path will be shifted.

In another embodiment, the polarization corrector may include a half-wave plate having multiple optic axes.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 4 shows how to produce color-by-color image frames from an original image frame;

FIGS. 8A and 8B show how a number of image subframes are synthesized together;

DETAILED DESCRIPTION OF THE PRESENT INVENTION

Figure 1:
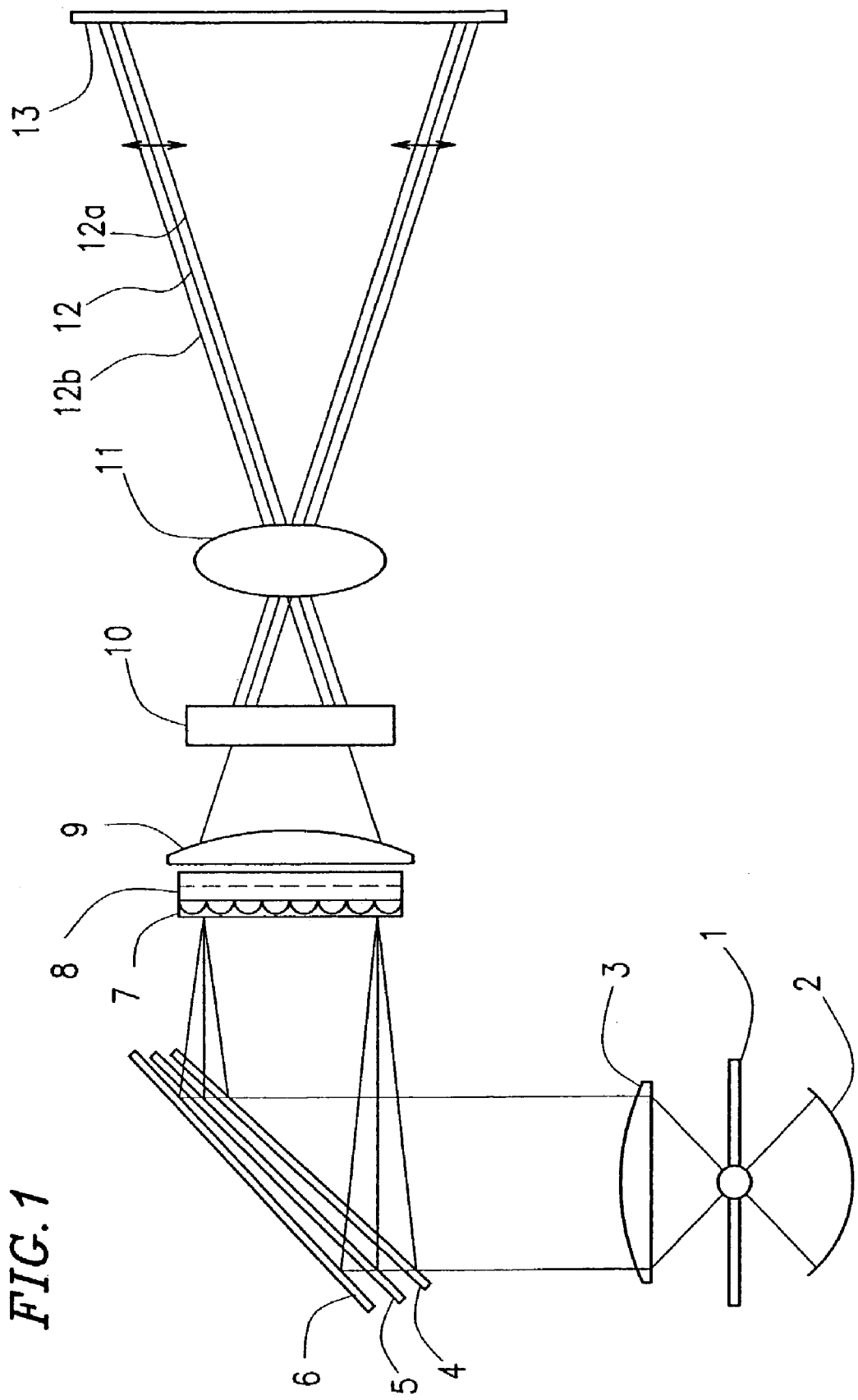
FIG. 1 is a schematic representation illustrating a projection type optical display system according to the present invention.

According to the present invention, in a single-panel projection type optical display system including no color filters, for example, data representing a plurality of image subframes are generated from data representing each image frame as an image component. Then, the image subframes are displayed by a display panel time-sequentially. Thereafter, by sequentially shifting these image subframes on a projection plane, the same area on the projection plane is sequentially irradiated with multiple light rays that have been modulated by mutually different pixel regions of the display panel and that fall within respectively different wavelength ranges (which will be herein referred to as "R, G and B light rays"), thereby realizing a high-resolution full-color display.

For example, take a particular area on the projection plane, which corresponds to one pixel. In the present invention, the particular area may be irradiated with a red (R) light ray in a period during which a subframe is being displayed (which period will be herein referred to as a "subframe period"). In that case, the particular area may be irradiated with a green (G) light ray in the next subframe period and with a blue (B) light ray in the following subframe period, respectively. In this manner, according to the present invention, the color of each pixel on the projection plane is defined by the time-sequential irradiation of the R, G and B light rays.

There is a significant difference between the conventional projection type color optical display system of field sequential type and the present invention.

Specifically, in the conventional field sequential method, the display panel is alternately irradiated with the R, G and B light rays. Accordingly, in one subfield period, all pixel regions of the display panel are irradiated with one of the R, G and B light rays. As a result, each image subframe on the projection plane is made up of pixels representing the color of the R, G or B light ray. However, the R, G and B image subframes are displayed time-sequentially at very short time intervals, which are even shorter than the time resolution of the human visual sense. Consequently, a color image is recognized by the human eyes as an afterimage.

In contrast, according to the present invention, each image subframe is formed by combining the R, G and B light rays with each other as will be described in detail later. That is to say, in a subframe period, the projection plane is irradiated with the R, G and B light rays that have been modulated by the display panel. Each of the R, G and B light rays that have been modulated by the display panel irradiates one position on the projection plane in one subframe period but irradiates another position on the projection plane in the next subframe period. Then, those light rays are synthesized together with time, thereby displaying a full-color image frame thereon.

According to the present invention, such a time-sequential synthesis of the R, G and B light rays is performed by an optical shifter. The optical shifter is disposed between the display panel and the projection plane to change the optical path of the light ray, which has been modulated by the display panel, periodically and regularly.

The present invention is not limited to a projection type optical display system but is also effectively applicable for use in a direct viewing type optical display system such as viewer or head mounted display. In the following description, however, embodiments of the present invention will be described as being applied to such a projection type optical display system.

Hereinafter, an exemplary arrangement of an optical display system according to a first specific embodiment will be described with reference to FIG. 1.

Embodiment 1

The optical display system of this embodiment is a projection type. The display system includes a light source 1, an LCD panel 8, light control means and a projection optical system. The light control means is provided to focus the light, emitted from the light source 1, onto associated pixel regions of the LCD panel 8 in accordance with the wavelength ranges thereof. The projection optical system is provided to project the light rays, which have been modulated by the LCD panel 8, onto a projection plane.

This projection type optical display system further includes a spherical mirror 2, a condenser lens 3 and dichroic mirrors 4, 5 and 6. The spherical mirror 2 reflects the (white) light, which has been emitted backward from the light source 1, forward. The condenser lens 3 collimates the light, which has come from the light source 1 and the spherical mirror 2, into a parallel light beam. Then, the light beam is split by the dichroic mirrors 4, 5 and 6 into a plurality of light rays according to the wavelength ranges thereof. The light rays that have been reflected by the dichroic mirrors 4, 5 and 6 are then incident onto a microlens array 7 at mutually different angles in accordance with their wavelength ranges. The microlens array 7 is attached to one of the two substrates of the LCD panel 8 that is located closer to the light source 1. The light rays, which have been incident onto the microlens array 7 at their respective angles, will be focused on their associated pixel regions that are located at mutually different positions.

In this projection type optical display system, the projection optical system includes a field lens 9 and a projection lens 11 to project the light beam 12, which has been transmitted through the LCD panel 8, onto a screen (i.e., the projection plane) 13. In this embodiment, an optical shifter 10 is disposed between the field lens 9 and the projection lens 11. FIG. 1 illustrates light rays 12a and 12b that have been shifted parallelly to the projection plane by the optical shifter 10. To get these light rays shifted, however, the optical shifter 10 may be disposed anywhere between the LCD panel 8 and the screen 13. For example, the optical shifter 10 may be disposed between the projection lens 11 and the screen 13.

In FIG. 1, a plane that includes every normal to the reflective planes of the three dichroic mirrors 4, 5 and 6 (i.e., a color separation plane) is illustrated as being parallel to the paper of FIG. 1 and the pixel shifting direction (will be also referred to herein as an "image shifting direction") is also illustrated as being parallel to the color separation plane. However, the pixel shifting direction does not have to be parallel to the color separation plane. In a embodiment to be described later, the pixel shifting direction is perpendicular to the color separation plane. More specifically, the color separation plane may be parallel to the horizontal direction on the screen of the LCD panel while the pixel shifting direction may be parallel to the vertical direction on the screen of the LCD panel. Naturally, though, the pixel shifting direction does not have to be parallel to the vertical direction on the screen but may be parallel to the horizontal direction on the screen.

Next, the respective members of this projection type optical display system will be described one by one.

In this embodiment, a metal halide lamp having an optical output power of 150 W, an arc length of 5 mm and an arc diameter of 2.2 mm is used as the light source 1 and is disposed such that the arc length direction thereof is parallel to the paper sheet. Examples of other preferred light sources 1 include a halogen lamp, an extra-high voltage mercury lamp and a xenon lamp. The light source 1 used in this embodiment radiates white light including light rays falling within three wavelength ranges corresponding to the three primary colors.

The spherical mirror 2 is disposed behind the light source 1. The condenser lens 3, having an aperture of 80 mmφ and a focal length of 60 mm, is disposed in front of the light source 1. The spherical mirror 2 is positioned so as to have its center aligned with the center of the emitting portion of the light source 1, while the condenser lens 3 is positioned so as to have its focal point aligned with the center of the light source 1.

In this arrangement, the light emitted from the light source 1 is collimated by the condenser lens 3 so that the LCD panel 8 is illuminated with the collimated light. The degree of parallelism of the light that has passed through the condenser lens 3 may be about 2.2 degrees in the arc length direction (i.e., a direction parallel to the paper of FIG. 1) and about 1 degree in the arc diameter direction.

The LCD panel 8 used in this embodiment is a transmission type liquid crystal display in which the microlens array 7 is disposed on one of its two transparent substrates that is located closer to the light source. Any liquid crystal material or any operation mode may be selected but the LCD panel 8 is preferably able to operate at a sufficiently high speed. In this embodiment, the panel 8 operates in a twisted nematic (TN) mode. The LCD panel 8 includes a plurality of pixel regions for modulating the incoming light. As used herein, the "pixel regions" refer to respective light modulating portions of the display panel that are spatially separated from each other. In this LCD panel 8, a voltage is applied from a pixel electrode, associated with one of those pixel regions, to an associated portion of the liquid crystal layer, thereby changing the optical properties of that portion and modulating the light.

In this LCD panel 8, 768 (H)×1,024 (V) scan lines may be driven by a noninterlaced scanning technique. The pixel regions of the LCD panel 8 are arranged two-dimensionally on the transparent substrates. In this embodiment, the pitch of the pixel regions measures 26 μm both horizontally and vertically. Also, in this embodiment, the R, G and B pixel regions are arranged so as to form a striped pattern in the horizontal direction of the screen, and each of the microlenses is allocated to one of multiple sets of three pixel regions (i.e., the R, G and B pixel regions).

Figure 2:
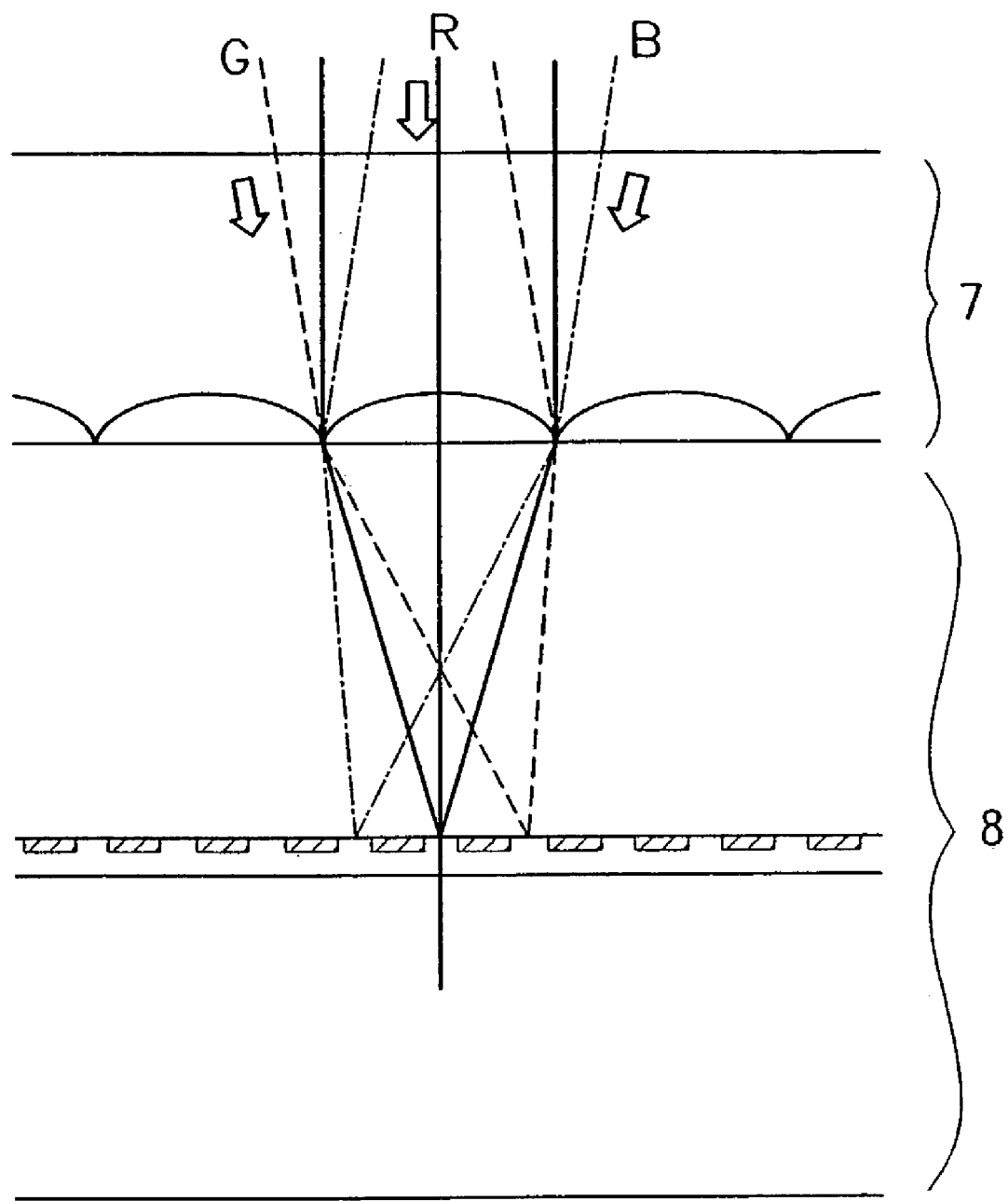
FIG. 2 is a cross-sectional view schematically illustrating an LCD panel.

As shown in FIG. 1, the R, G and B light rays, impinging on the LCD panel 8, have been produced by getting the white light, radiated from the light source 1, split by the dichroic mirrors 4, 5 and 6. The R, G and B light rays are incident onto the microlens array 7 on the LCD panel 8 at mutually different angles. Accordingly, by appropriately setting the angles of incidence of these R, G and B light rays, these light rays may be distributed through one of the microlenses 7 to respective pixel regions corresponding to the three wavelength ranges as shown in FIG. 2. In this embodiment, the microlenses 7 have a focal length of 255 μm so that an angle of 5.8 degrees is formed between two of these light rays. More specifically, the R light ray is incident vertically onto the LCD panel 8, while each of the B and G light rays is incident thereon so as to define an angle of 5.8 degrees with the R light ray. In this preferred embodiment, a plane that includes the optical axes of the three split light rays (i.e., the color separation plane) is parallel to the horizontal direction on the screen of the LCD panel 8.

Figure 3:
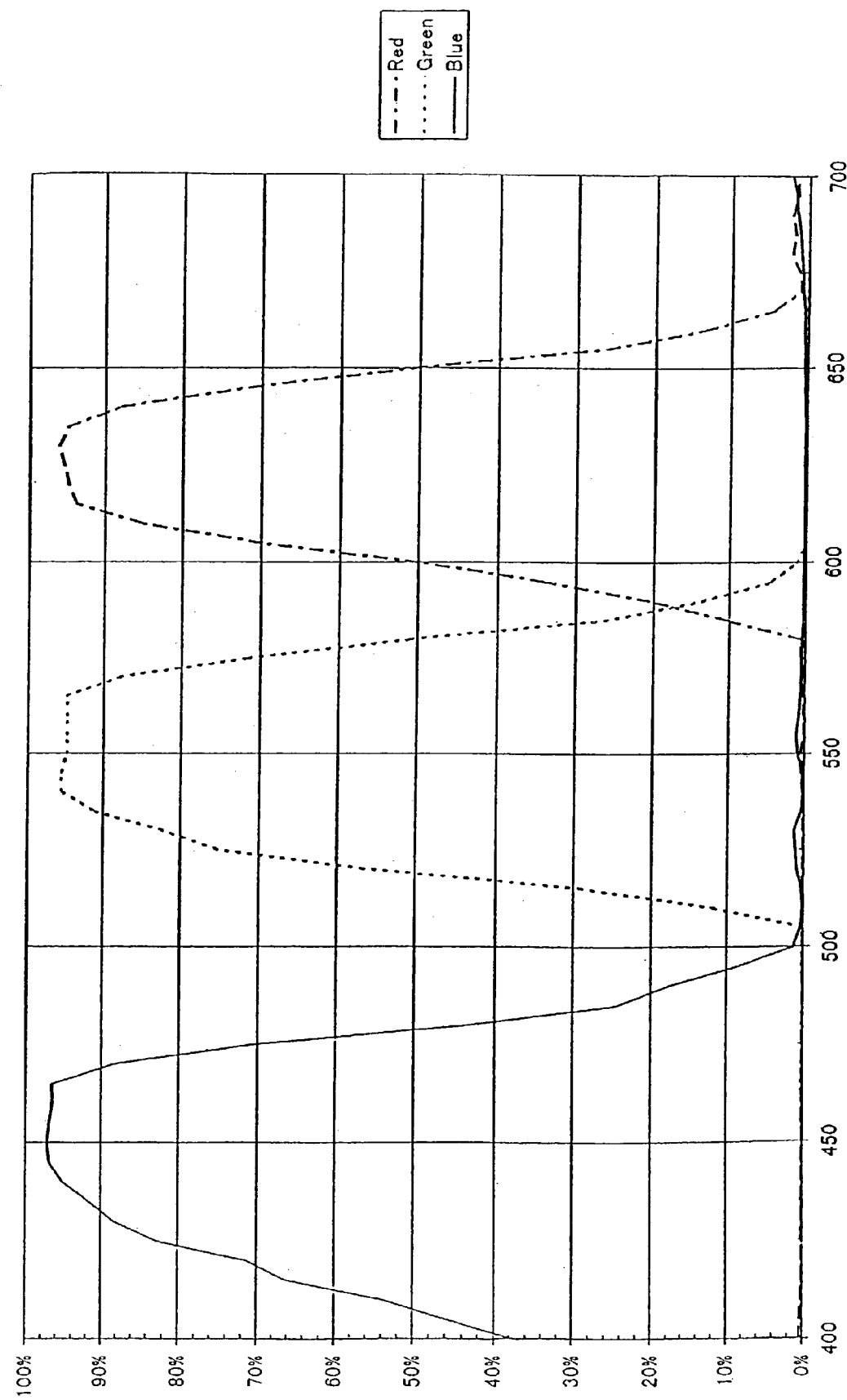
FIG. 3 is a graph showing the spectral characteristics of dichroic mirrors.

The dichroic mirrors 4, 5 and 6 may have spectral characteristics such as those shown in FIG. 3 and selectively reflect the green (G), red (R) and blue (B) light rays, respectively. The G light ray has a wavelength falling within the range of 520 nm to 580 nm, the R light ray has a wavelength falling within the range of 600 nm to 650 nm, and the B light ray has a wavelength falling within the range of 420 nm to 480 nm.

In this embodiment, the dichroic mirrors 4, 5 and 6 and the microlens array 7 are used to focus the light rays representing the three primary colors onto the respective pixel regions. Alternatively, any other optical element (e.g., a transmission type hologram having diffraction and spectral functions) may also be used.

As described above, the LCD panel 8 is driven by a noninterlaced scanning technique. Accordingly, the panel 8 displays 60 image frames per second. Thus, the time allotted to each frame (i.e., a frame time period T) is ¹⁄₆₀ second. That is to say, T=¹⁄₆₀ seconds≈16.6 milliseconds.

It should be noted that if the panel 8 is driven by an interlaced scanning technique, the scan lines on the screen are grouped into even-numbered lines and odd-numbered lines. In the interlaced scanning, either all of these even-numbered scan lines or all of these odd-numbered scan lines are alternately activated. Accordingly, T=¹⁄₃₀ second≈33.3 milliseconds. Also, the time allotted to each of the even- and odd-numbered fields that make up one frame (i.e., one field time period) is 1/60 second≈16.6 milliseconds.

In this embodiment, the information (or data) about the respective image frames that make up one complete image is sequentially stored in frame memories. In accordance with the information that has been selectively read out from the frame memories, multiple image subframes are formed one after another. Hereinafter, it will be described in detail how to form the image subframes.

For example, suppose an image represented by a frame (i.e., an image frame) is as shown in (a) of FIG. 4. This image frame should be displayed in full colors, and the colors of the respective pixels are determined in accordance with the data defining this image frame. It should be noted that in the interlaced scanning technique, an image represented by a field may be processed similarly to an "image frame" as used herein.

Figure 5A:
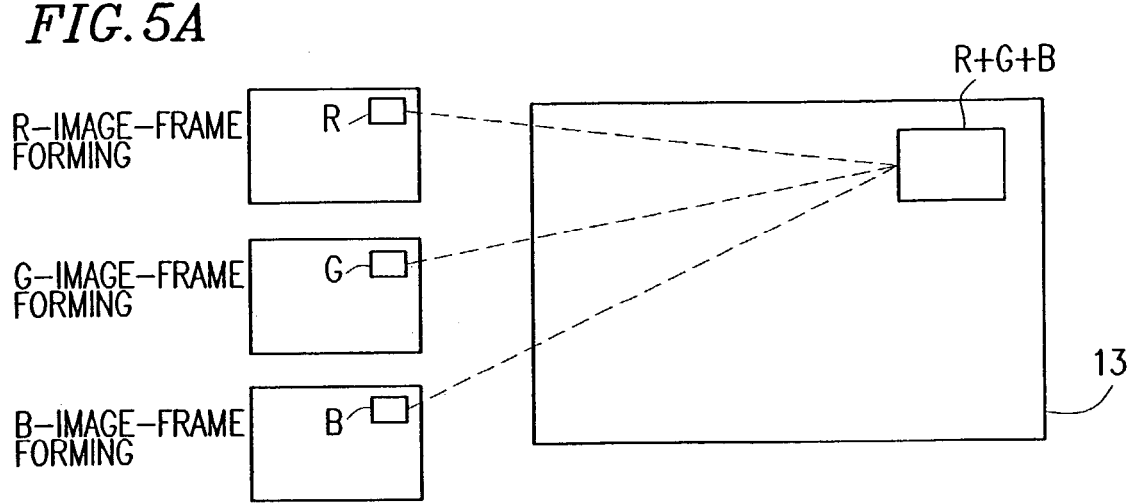
FIGS. 5A through 5C show how the color display principle of the present invention is different from the conventional color display principles.

The conventional three-panel projection type optical display system separates the data into three data subsets corresponding to the R, G and B light rays for the, respective pixels, thereby generating three data subsets representing the R, G and B image frames as shown in (b), (c) and (d) of FIG. 4. Then, the R, G and B image frames are displayed simultaneously by three R, G and B display panels so as to be superimposed one upon another on the projection plane 13. FIG. 5A schematically shows how the R, G and B image frames are superimposed one upon another for a particular pixel on the projection plane 13.

Figure 5B:
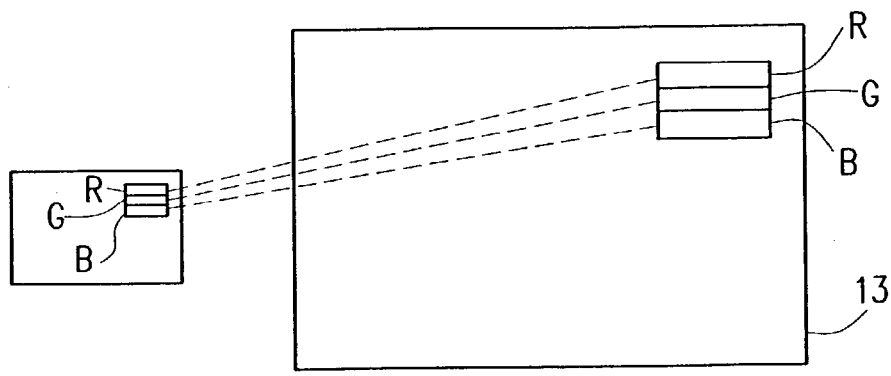

In a conventional single-panel projection type optical display system on the other hand, pixel regions for the R, G and B light rays are provided at mutually different positions inside the single display panel. In accordance with the data that should represent the R, G and B image frames, the R, G and B light rays are modulated by their respective pixel regions, thereby forming a color image on the projection plane. In this case, an area on the projection plane that has a size smaller than the spatial resolution of the human visual sense is illuminated with the R, G and B light rays. Accordingly, even though the R, G and B light rays are actually separated from each other spatially, the human eyes sense as if a single pixel had been formed on the projection plane. FIG. 5B schematically shows how virtually one particular pixel on the projection plane 13 is illuminated with the R, G and B light rays.

Figure 5C:
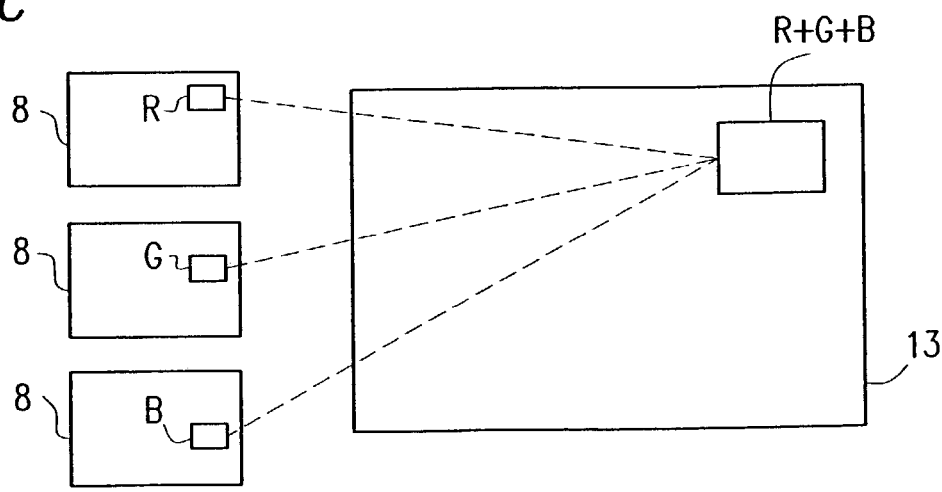

In contrast, unlike any of these conventional techniques, the single-panel projection type optical display system of this embodiment sequentially illuminates the same area on the projection plane 13 with the R, G and B light rays that have been modulated by mutually different pixel regions of the single display panel 8, thereby forming a pixel on that same area. That is to say, taking an arbitrary pixel on the projection plane 13, the pixel is displayed by a method similar to the known field sequential technique. However, the method of this embodiment is entirely different from the conventional field sequential technique in that the R, G and B light rays that make up one pixel have been modulated by mutually different pixel regions of the single display panel. FIG 5C schematically shows how the R, G and B light rays that are irradiated time-sequentially are combined for a particular pixel on the projection plane 13 in one frame period. The three images shown on the left-hand side of FIG 5C correspond to the three mutually different image sub frames produced by the single display panel 8.

As can be easily seen from FIGS. 5A through 5C, even though just one display panel is used in this embodiment, a full-color image can be displayed at as high resolution and brightness as those realized by the three-panel type.

Next, it will be described in detail with reference to FIG. 6 how the image subframes are formed.

Figure 6:
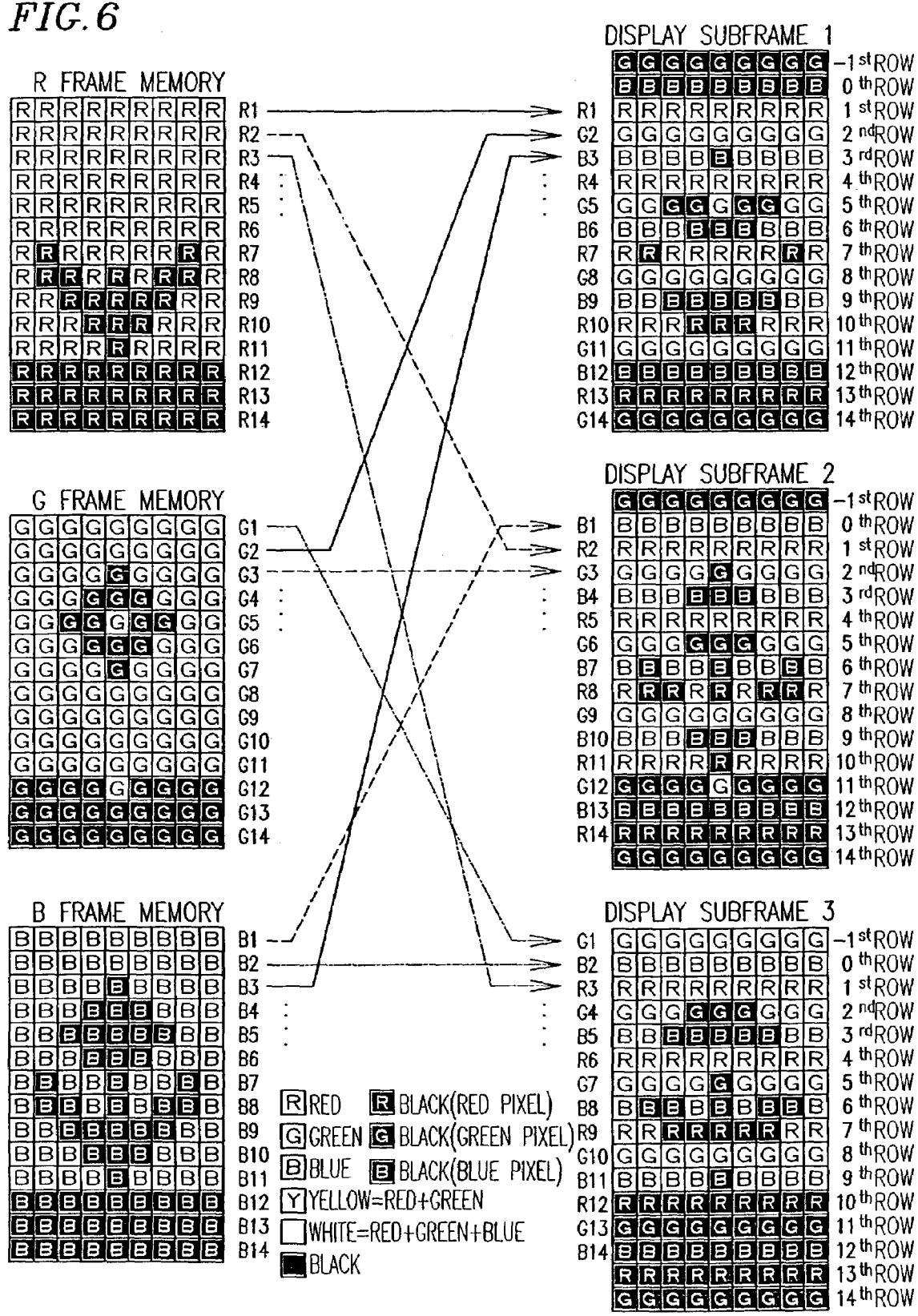
FIG. 6 shows how to generate three subframe data from color-by-color image frame data.
Figure 7:
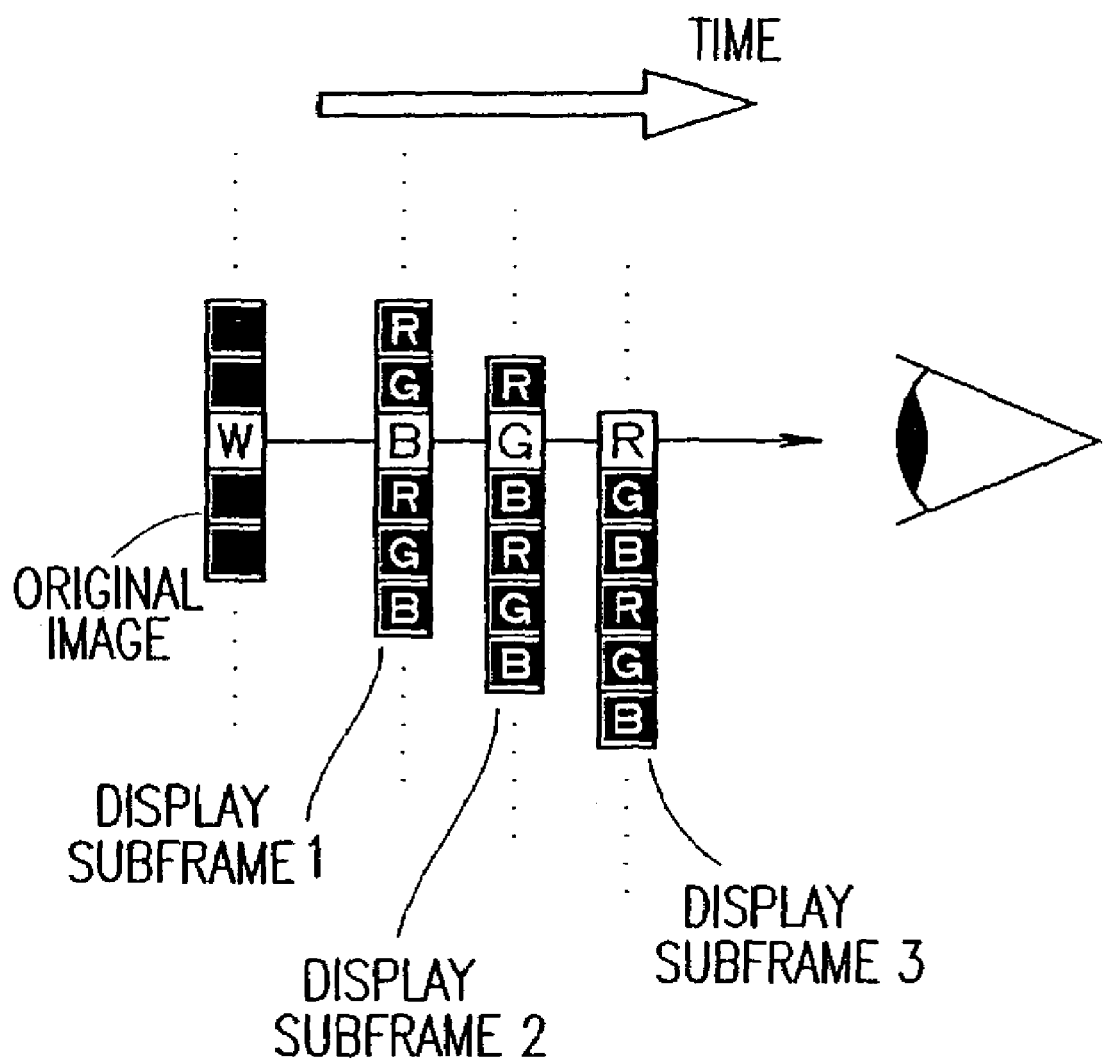
FIG. 7 shows a mode to shift image subframes (i.e., image shifting)

The left-hand side of FIG. 6 illustrates the three data sets representing R, G and B image frames that are stored on R, G and B frame memories, respectively. On the other hand, the right-hand side of FIG. 6 illustrates display subframes Nos. 1, 2 and 3. In this embodiment, an image represented by a display subframe No. 1 is displayed on the projection plane during the first one-third of a frame period (i.e., a first subframe period). During the next one-third (i.e., second subframe period), an image represented by a display subframe No. 2 is displayed. And during the last one-third (i.e., third subframe period), an image represented by a display subframe No. 3 is displayed. In this embodiment, these three image subframes are displayed while being shifted from each other as shown in FIG. 7 and are combined together time sequentially. As a result, an original image such as that shown in (a) of FIG. 4 is recognized by the viewer's eyes.

Next, it will be described in detail how the data is arranged in an image subframe by taking display subframe No. 1 as an example.

As shown in FIG. 6, the data representing the first row of the pixel region for display subframe No. 1 is the data about pixels on the first row R1 that is stored in the R frame memory. The data representing the second row of the pixel region for display subframe No. 1 is the data about pixels on the second row G2 that is stored in the G frame memory. The data representing the third row of the pixel region for display subframe No. 1 is the data about pixels on the third row B3 that is stored in the B frame memory. And the data representing the fourth row of the pixel region for display subframe No. 1 is the data about pixels on the fourth row R4 that is stored in the R frame memory. The data representing the remaining rows of display subframe No. 1 will be made up in the same manner after that.

The data representing display subframe No. 2 or 3 is also collected as in display subframe No. 1. As for display subframe No. 2, for example, the data representing the zeroth row of its pixel region is the data about pixels on the first row B1 that is stored in the B frame memory. The data representing the first row of the pixel region for display subframe No. 2 is the data about pixels on the second row R2 that is stored in the R frame memory. The data representing the second row of the pixel region for display subframe No. 2 is the data about pixels on the third row G3 that is stored in the G frame memory. And the data representing the third row of the pixel region for display subframe No. 2 is the data about pixels on the fourth row B4 that is stored in the B frame memory.

In this manner, the data subsets that have been read out from the R, G and B frame memories are combined in a predetermined order, thereby compiling data representing each of the subframes to be displayed time-sequentially. Thus, the data representing each subframe contains information about all of the three primary colors of R, G and B. However, as for each of these colors R, G and B, the information contained is about just one-third of the entire screen, spatially speaking. More specifically, as can be easily seen from FIG. 6, the R information contained in display subframe No. 1 is concerned with just the first, fourth, seventh, tenth pixel rows, etc. of the image frame to be formed. The R information about the other pixel rows of the image frame is allocated to display subframes Nos. 2 and 3.

In this embodiment, information about the same color is always displayed in each pixel region of the display panel. However, shifting and projecting the respective subframes synthesizes the subframes to form a full image frame. It should be noted that the total number of pixel rows in a pixel region of the display panel is larger by two than the number of pixel rows that make up one subframe image as shown in FIG. 6. These two additional rows are provided as a margin for image shifting.

Next, it will be described with reference to FIGS. 8 and 9 how those image subframes mutually shifted are synthesized together into one image frame.

Figures 8A, 8B:
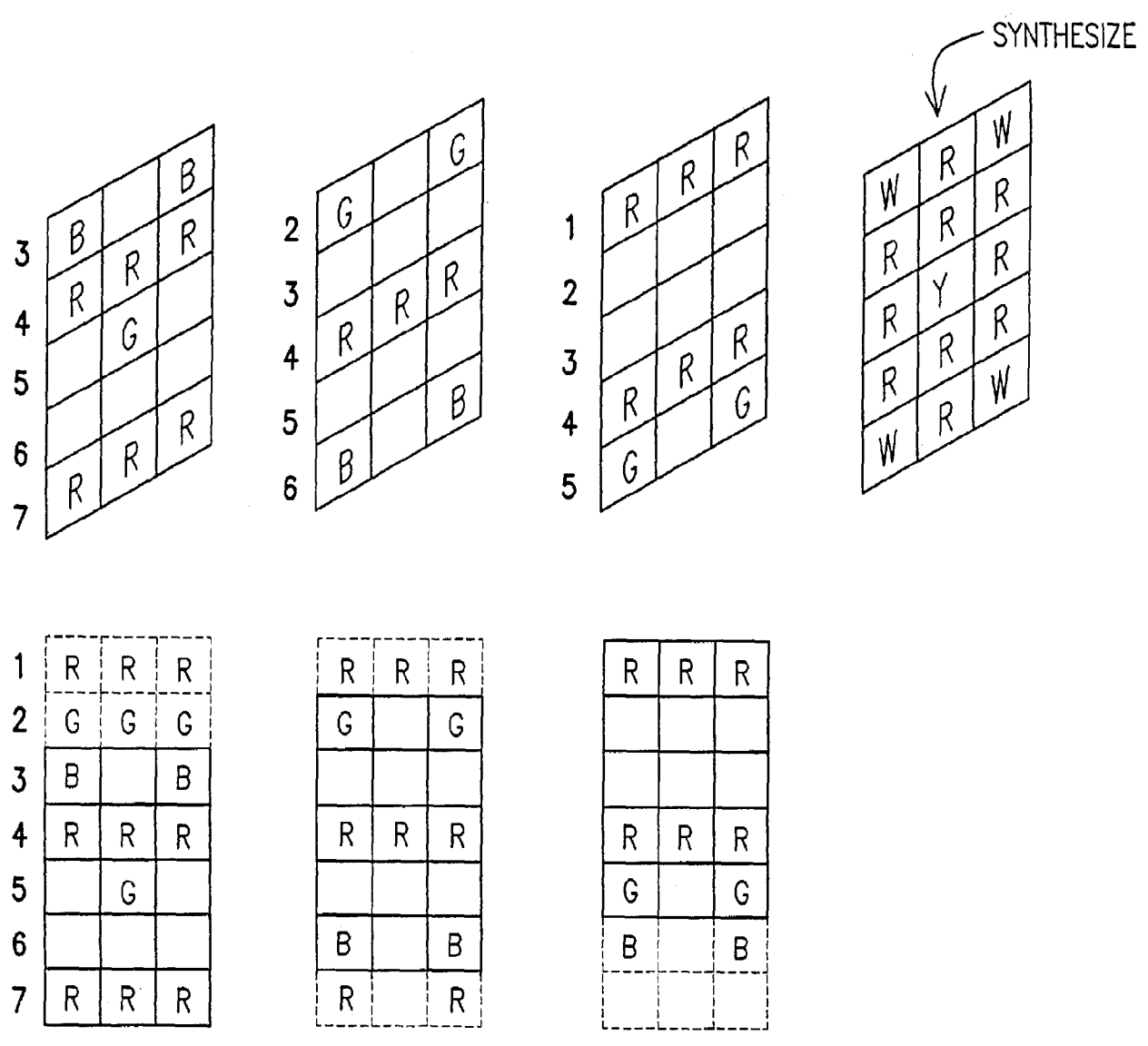

Referring to FIG. 8A, illustrated is a perspective view showing respective parts of three image subframes that have been projected onto a projection plane such as a screen. In FIG. 8A, display subframes Nos. 1, 2 and 3 and synthesized image frame are schematically illustrated from left to right. A portion of the display subframe No. 1 including the third through seventh rows thereof, a portion of the display subframe No. 2 including the second through sixth rows thereof, and a portion of the display subframe No. 3 including the first through fifth rows thereof are spatially superimposed one upon another on the projection plane although these portions are projected there at mutually different points in time. As a result, a single image frame is formed.

The pixel regions for the R, G or B portions are fixed on the display panel as shown in FIG. 8B. However, the optical paths of the image subframes are shifted by the optical shifter provided between the display panel and the projection plane, thereby realizing the synthesis of the image subframes as shown in FIG. 8A.

Hereinafter, it will be described how to shift the image subframes.

Figure 9:
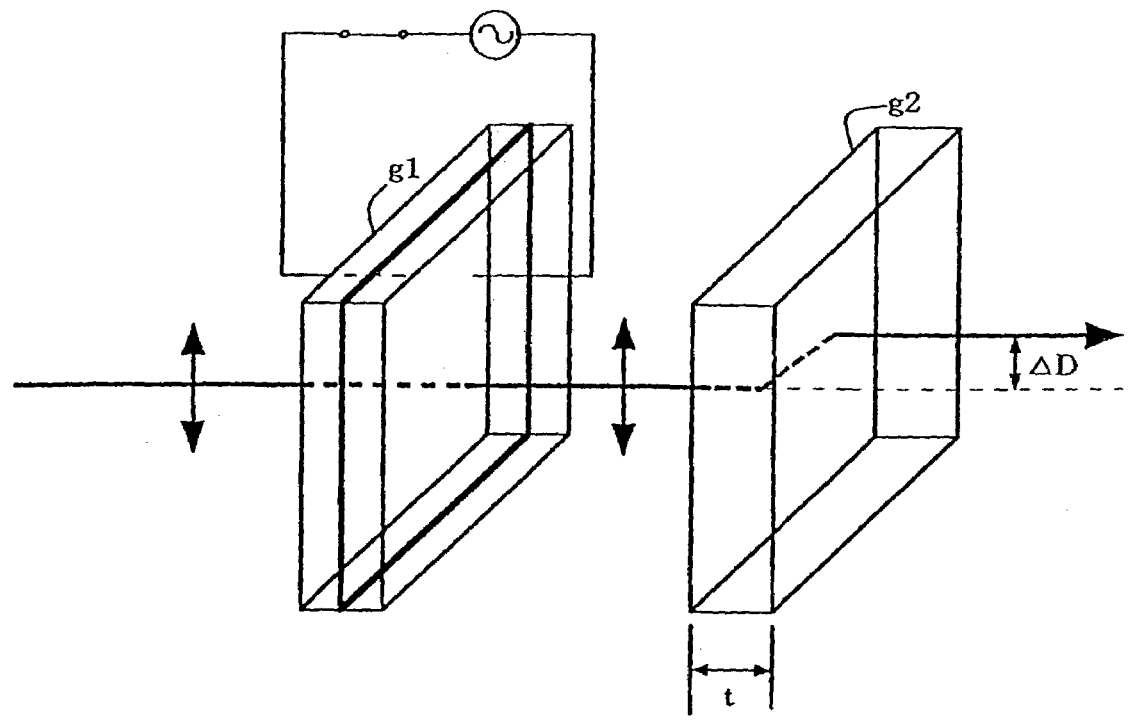
FIG. 9 is a perspective view illustrating an optical shifter.
Figure 10:
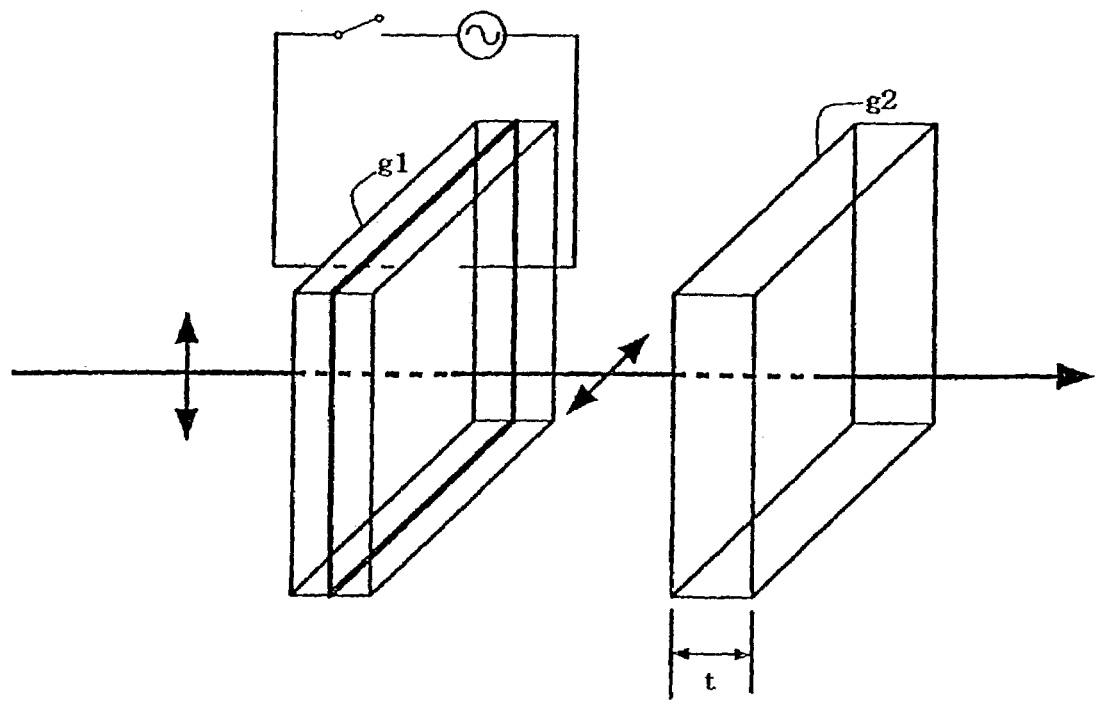
FIG. 10 is a perspective view illustrating another optical shifter.
Figure 11:
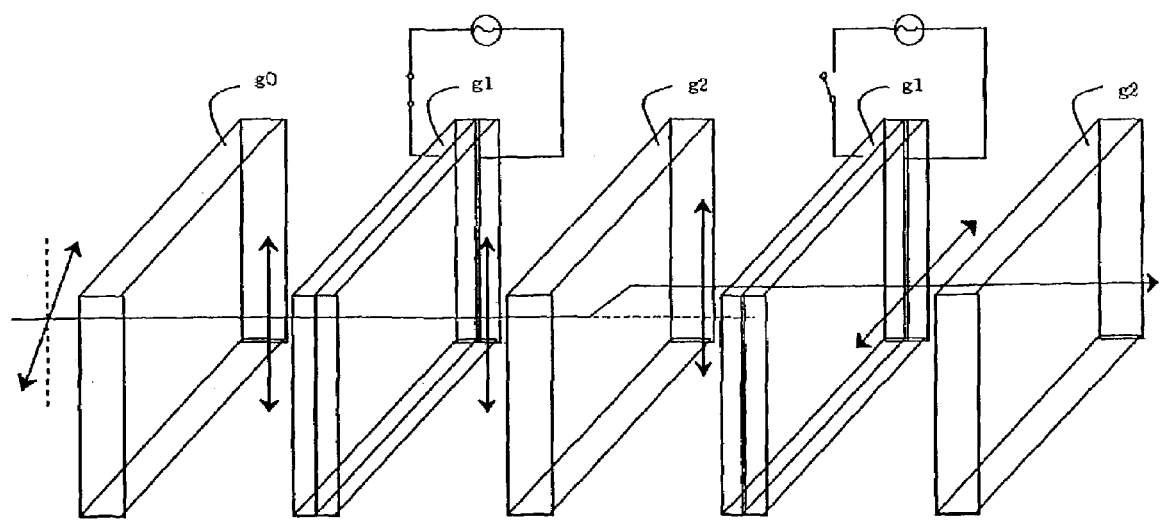
FIG. 11 is a perspective view illustrating an exemplary arrangement for an optical shifter.

The optical shifter of this embodiment is obtained by preparing two pairs of elements such as those shown in FIG. 9 (or FIG. 10) and arranging those two pairs of elements in series on the optical path as shown in FIG. 11. Each pair of elements shown in FIG. 9 or 10 includes a first element g1 and a second element g2. The first element g1 switches from the state of transmitting the incoming light ray as it is without rotating the axis of polarization thereof at all into the state of rotating the axis of polarization of the incoming light ray 90 degrees, or vice versa. The second element g2 exhibits birefringence and has a thickness t. In the example illustrated in FIGS. 9 through 11, the first element g1 is a liquid crystal cell, and can be switched between these two states by controlling the ON/OFF states of the voltage to be applied to the liquid crystal layer of the liquid crystal cell. The second element g2 may be made of quartz, for example.

In the state shown in FIG. 9, a voltage of 5 volts, for example, is applied to the first element g1, and the incoming light ray passes the first element g1 without rotating its axis of polarization at all and enters the second element g2. Since the second element g2 exhibits some birefringence, the light ray will have its optical axis shifted by ΔD when leaving the second element g2. More specifically, the ordinary ray component of the light ray that has entered the second element g2 travels straight through the second element g2, while the extraordinary ray component thereof is shifted toward the optic axis of the second element g2. The shift ΔD is adjustable by the thickness t of the second element g2. The second element g2 may be made of quartz or any other uniaxial crystalline material with birefringence. Examples of other preferred materials include lithium niobate, calcite, mica, rutile ($TiO_2$) and nitratine ($NaNO_3$). If the total weight of the display system should be reduced as in a head mounted display (HMD), lithium niobate or rutile having relatively large refractive index anisotropy Δn is preferably used. When the second element g2 is made of such a high Δn material, the minimum required shift is realized by the birefringent element g2 with a reduced thickness. Thus, such a material can be used effectively to reduce the overall size or weight of the display system.

In the state shown in FIG. 10 on the other hand, substantially no voltage is applied to the first element g1, and the incoming light ray has its axis of polarization rotated approximately 90 degrees by the first element g1. As a result, the light ray transmitted through the second element g2 will not have its optical axis shifted.

The optical shifter of this embodiment is obtained by preparing two pairs of shifting elements such as those shown in FIG. 9 (or FIG. 10) and arranging those two pairs of shifting elements in series on the optical path as shown in FIG. 11. In such an optical shifter including multiple pairs of shifting elements, one of three different locations on the projection plane can be selected according to the voltage application states of the two liquid crystal layers on the light incoming side and light outgoing side on the optical path. That is to say, one of the three different locations is selected according to a particular combination of the voltage application state (i.e., ON or OFF state) of the first liquid crystal layer on the light incoming side and the voltage application state (i.e., ON or OFF state) of the second liquid crystal layer on the light outgoing side.

On the other hand, the R, G and B rays are incident onto the LCD panel 8 at mutually different angles as described above. Specifically, the G and B rays define angles of ±7.6 degrees with the R ray horizontally. Accordingly, the LCD panel 8 needs to have a broadened viewing angle in the horizontal direction of the screen. For that purpose, the liquid crystal molecules in the LCD panel preferably have their orientation directions aligned so as to define either an angle of about 45 degrees or an angle of around 45 degrees (i.e., about 40 degrees to about 55 degrees) with respect to the vertical direction on the screen (i.e., the shifting direction in this preferred embodiment). That is to say, the liquid crystal molecules preferably have either a twist angle of about 90 degrees or a twist angle of about 80 degrees to about 110 degrees.

If the liquid crystal molecules in the liquid crystal layer of the LCD panel are aligned with such a direction, then the light ray that has gone out of such an LCD panel has a polarization direction that defines either an angle of about 45 degrees or an angle of around 45 degrees (i.e., an angle of about 40 degrees to about 55 degrees) with the horizontal direction on the screen. On the other hand, the shifting direction of the optical shifter is the vertical direction on the screen in this preferred embodiment. Accordingly, unless the polarization direction of the outgoing light ray of the display panel is rotated either dextrorotatorily or levorotatorily around its optical axis, both the ordinary ray and extraordinary ray will be incident onto the quartz (birefringent) element of the optical shifter, thus producing a ghost image. That is to say, to avoid such an unwanted phenomenon, the polarization direction of the outgoing light ray of the display panel should be rotated in either direction around its optical axis so as to be either perpendicular to, or parallel to, the shifting direction.

As shown in FIG. 11, one of the characteristic features of this embodiment is to provide a polarization corrector g0 on the light incoming side of the optical shifter. The polarization corrector g0 selectively rotates the polarization direction of the incoming light ray (i.e., the outgoing light ray of the LCD panel in this case). In the embodiment illustrated in FIG. 11, the polarization corrector g0 is provided between the display panel and the optical shifter. Alternatively, the polarization corrector g0 may be combined with the optical shifter. That is to say, the combination of the optical shifter and polarization corrector g0 of this embodiment may be used as a single optical shifter with the polarization correcting function.

For example, a TN mode liquid crystal cell may be used as such a polarization corrector g0. However, the polarization corrector g0 does not have to switch the polarization states. Thus, in this embodiment, a half-wave plate is used as the polarization corrector g0. The half-wave plate as the polarization corrector g0 is less expensive than the TN mode liquid crystal cell as the polarization corrector.

In this embodiment, the half-wave plate has a retardation value of about 225 nm and the slow axis or fast axis thereof defines an angle of about 22.5 degrees with respect to the shifting direction. The half-wave plate may be made of ARTON produced by JSR Corporation, for example.

Figure 12:
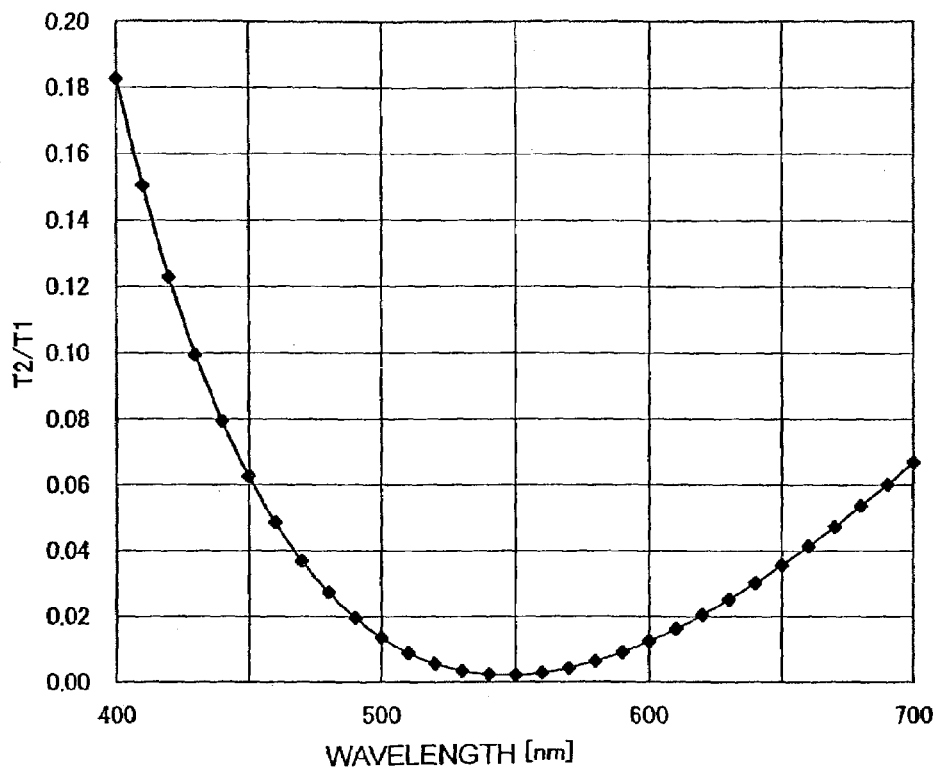
FIG. 12 is a graph showing how the quantity of light transmitted through a half-wave plate changes with the wavelength of the light in a first specific embodiment of the present invention.

A pair of polarizers was disposed on the light incoming side and light outgoing side of the half-wave plate such that their transmission axes defined an angle of about 45 degrees and an angle of about 0 degrees with the shifting direction, respectively. The quantity of light that was transmitted through the half-wave plate was measured for such an arrangement. The results are shown in FIG. 12. In FIG. 12, the abscissa represents the wavelength of the incoming light ray and the ordinate represents the quantity of light transmitted, or the transmittance T2/T1, where T1 is the intensity of the incoming light ray and T2 is the intensity of the outgoing light ray.

As can be seen from FIG. 12, roughly only the ordinary ray component (or the extraordinary ray component) entered the birefringent element (of quartz) of the optical shifter particularly around the center wavelength of G ray of about 550 nm. This is because in the arrangement of this embodiment, the polarization state of the incoming light ray is corrected before entering the birefringent element of the optical shifter.

As described above, according to this embodiment, even if the polarization axis of the outgoing light ray of the display panel is not aligned with the shifting direction, appropriate optical shifting is also realized by the polarization corrector. Accordingly, the selected image subframe can be shifted just as intended with information about the same color always displayed at each pixel region of the display panel and with its orientation direction optimized for the optical system. In this manner, each pixel region can present information about different locations (or pixels) one subframe after another, thus realizing a high resolution.

Meanwhile, to increase the efficiency of reflection, the dichroic mirrors 4 through 6 are preferably designed to selectively reflect a polarized light ray that vibrates either perpendicularly or parallelly to the plane including (the optical axes of) the incoming light ray and the reflected light ray (i.e., the paper of FIG. 1). However, if the polarization direction of the outgoing light ray of the LCD panel defines an angle of about 45 degrees or an angle of around 45 degrees (i.e., about 40 degrees to about 55 degrees) with the horizontal direction on the screen as in this preferred embodiment, then the dichroic mirrors 4 through 6 also need to be designed to reflect a polarized light ray having a polarization direction that defines an angle of about 45 degrees or an angle of around 45 degrees (i.e., about 40 degrees to about 55 degrees) with the plane including the incoming light ray and reflected light ray. Nevertheless, the dichroic mirrors 4 through 6 designed in that manner would have decreased wavelength separation ability or reflection efficiency.

To avoid the decrease in the wavelength separation ability or the reflection efficiency of the dichroic mirrors 4 through 6, another half-wave plate, similar to the half-wave plate described above, is preferably provided on the light incoming side of the LCD panel. Then, the liquid crystal display device of this embodiment may also have the normal highly efficient arrangement in which a polarized light ray, having a polarization direction that is either perpendicular to or parallel to the plane including the incoming light ray and reflected light ray, enters the dichroic mirrors 4 through 6.

Hereinafter, a second specific embodiment of the present invention will be described. In this embodiment, a stack of half-wave plates is used as the polarization corrector g0 to rotate the polarization direction.

Embodiment 2

Hereinafter, a second specific preferred embodiment of the present invention will be described. In this preferred embodiment, a stack of half-wave plates is used as the polarization corrector g0 to rotate the polarization direction.

The achromatic performance is improved by the use of stacked wave plates as disclosed by S. Pancharatnam in "Achromatic Combinations of Birefringent Plates", Proceedings of Indian Academy of Sciences Vol. XLI, No. 4, Sec. A, 1955, pp. 130–136 and pp. 137–144.

Figure 22:
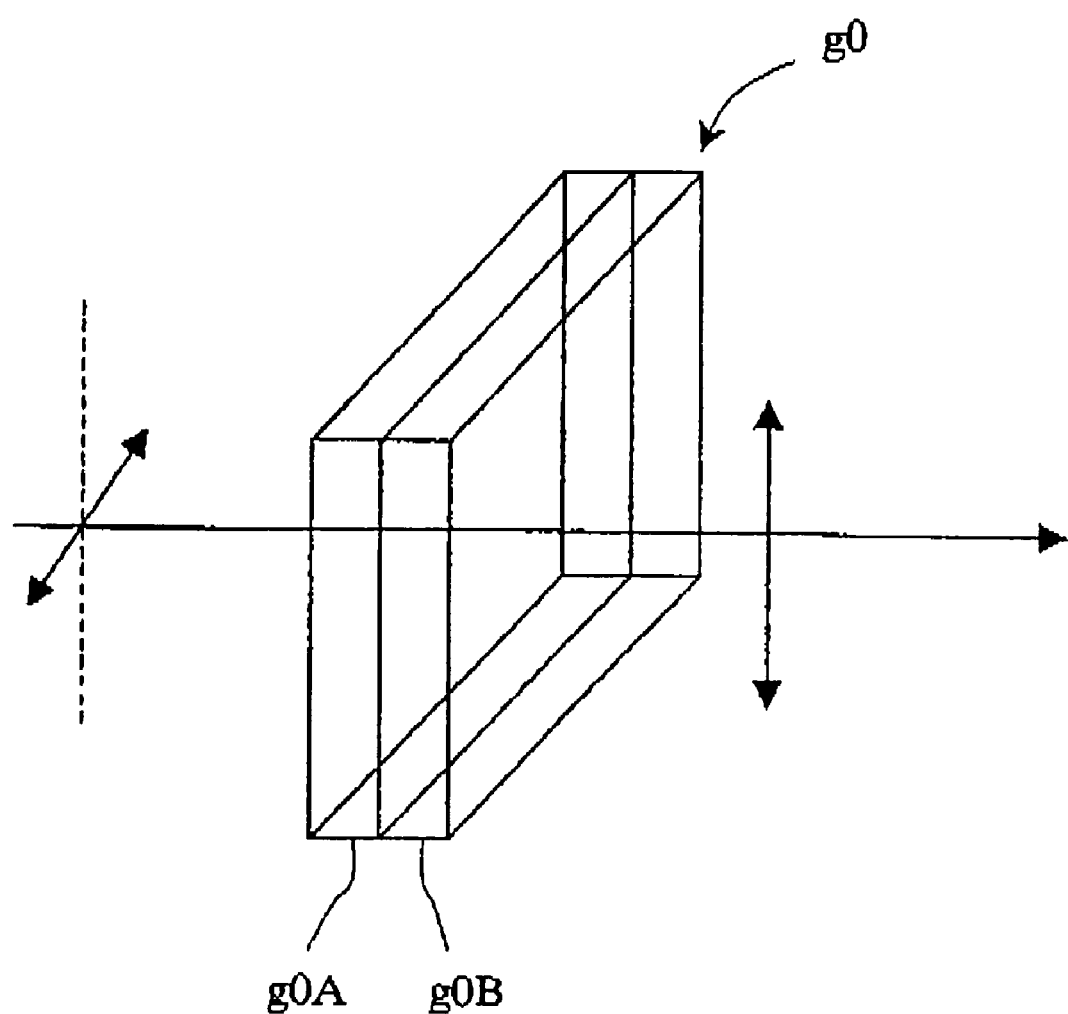
FIG. 22 is a polarization corrector that includes a first half-wave plate and a second half-wave plate.

Specifically, as shown in FIG. 22, the polarization corrector g0 for use in this embodiment includes a first half-wave plate g0A and a second half-wave plate g0B, which are stacked in this order such that the light enters the first half-wave plate g0a earlier than the second half-wavewave plate g0B. To increase the mass productivity, the two half-wave plates g0A and g0B for use in this embodiment are preferably made of the same material and preferably designed to have the same retardation value. Specifically, the two half-wave plates g0A and g0B may be both made of ARTON produced by JSR Corporation and both may have a retardation value of 225 nm. The two half-wave plates g0A and g0B are preferably stacked one upon the other and integrated together. However, those two half-wave plates g0A and g0B do not have to closely contact with each other. Also, the materials or the retardation values of the two half-wave plates g0A and g0B are not necessarily the same.

In this embodiment, the slow axis or fast axis of the half-wave plate on the light incoming side (i.e., the first half-wave plate) may define an angle of about 33.75 degrees with respect to the vertical direction on the screen. On the other hand, the slow axis or fast axis of the half-wave plate on the light outgoing side (i.e., the second half-wave plate) may define an angle of about 11.25 degrees with respect to the vertical direction on the screen. In other words, the slow axis or fast axis of the first half-wave plate may define an angle of about 11.25 degrees with the polarization direction (or polarization axis) of the incoming light ray, while the slow axis or fast axis of the second half-wave plate may define an angle of about 33.75 degrees with the polarization axis of the incoming light ray.

Figure 13:
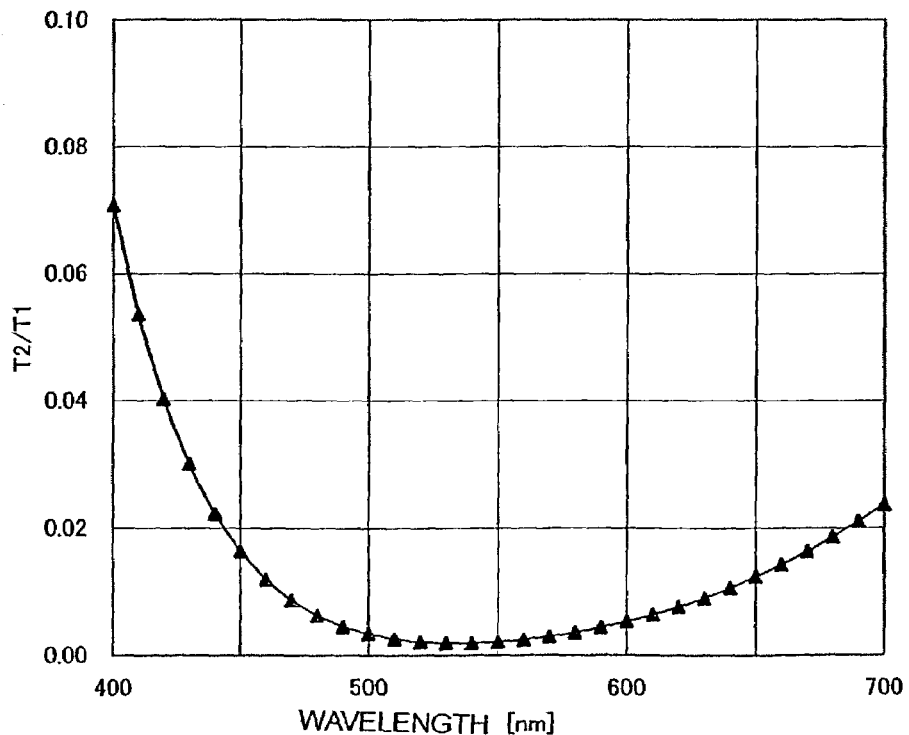
FIG. 13 is a graph showing how the quantity of light transmitted through two half-wave plates changes with the wavelength of the light in a second specific embodiment of the present invention.

As in the first embodiment described above, a pair of polarizers was disposed on the light incoming side and light outgoing side of the polarization corrector g0 such that their transmission axes defined an angle of about 45 degrees and an angle of about 0 degrees with the vertical direction on the screen, respectively. The quantity of light transmitted was measured for such an arrangement. The results are shown in FIG. 13. As can be seen from FIG. 13, only the ordinary ray component (or the extraordinary ray component) entered the birefringent element (of quartz) of the optical shifter particularly around the center wavelength of G ray of about 550 nm.

Figure 14:
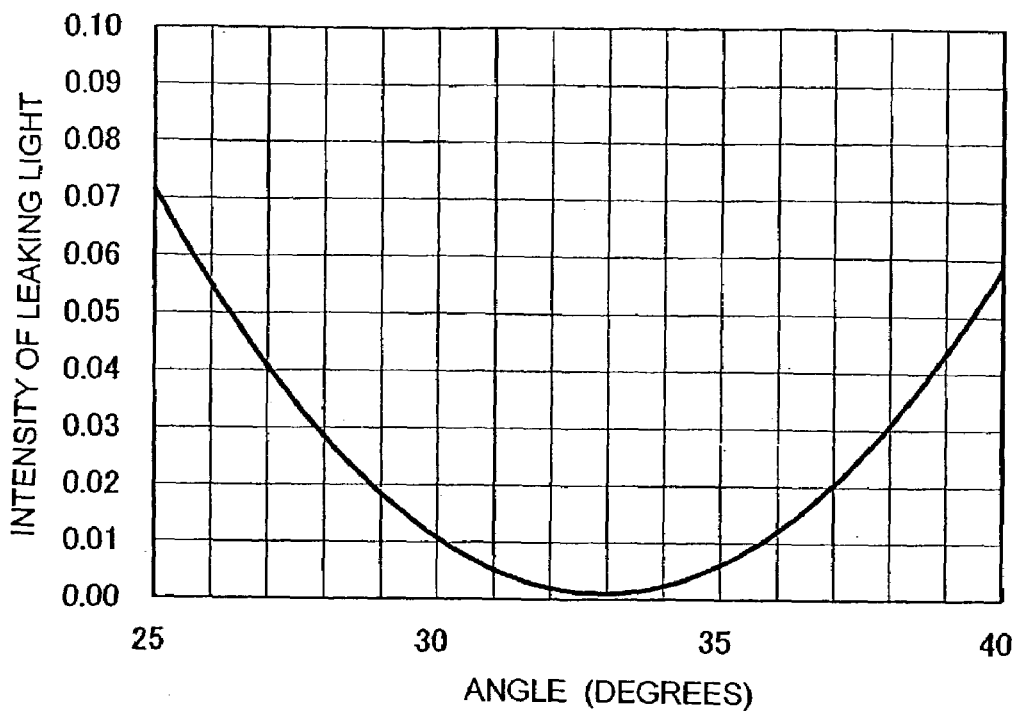
FIG. 14 is a graph showing how the quantity of leaking light changes with the slow-axis or fast-axis angle of the first one of the two half-wave plates.
Figure 15:
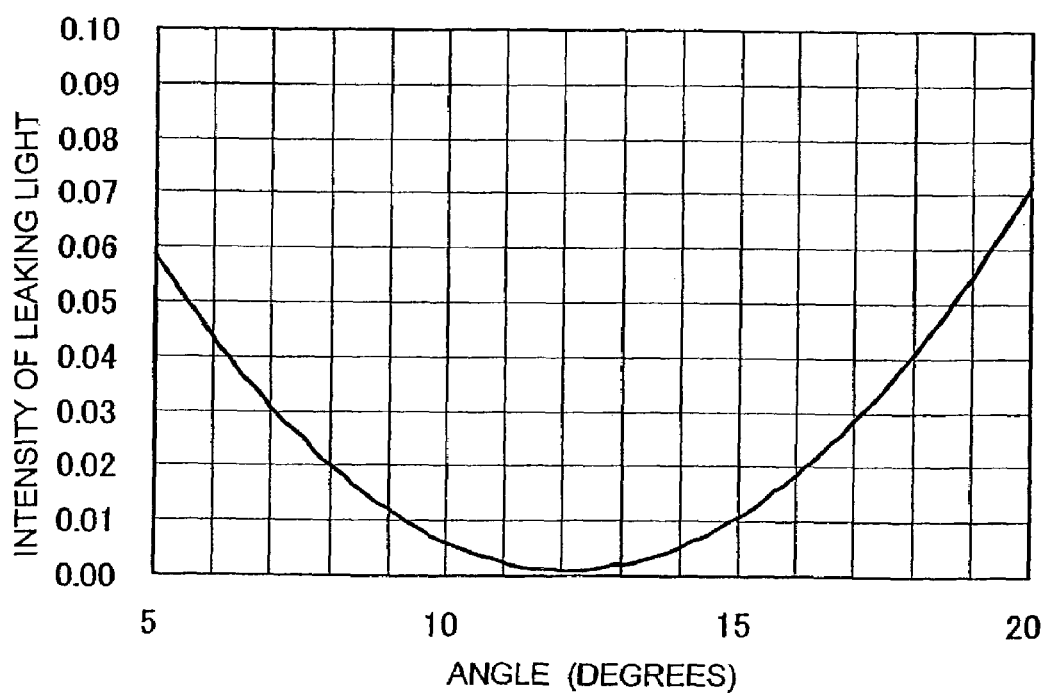
FIG. 15 is a graph showing how the quantity of leaking light changes with the slow-axis or fast-axis angle of the second one of the two half-wave plates.

The two half-wave plates of the polarization corrector g0 do not have to be arranged as described above. For example, two polarizers may be disposed on the light incoming side and light outgoing side of two half-wave plates, which are not stacked but arranged in series on the optical path, such that their transmission axes respectively define an angle of about 45 degrees and an angle of about 0 degrees with the vertical direction on the screen. With the slow-axis or fast-axis angles of the first and second half-wave plates changed, the quantity of light transmitted was measured. The results are shown in FIGS. 14 and 15. Specifically, FIG. 14 shows the quantity of light leaking when the slow-axis or fast-axis angle of the first half-wave plate was changed, while FIG. 15 shows the quantity of light leaking when the slow-axis or fast-axis angle of the second half-wave plate was changed. As can be seen from FIGS. 14 and 15, if the slow-axis or fast-axis angles of the half-wave plates are within ±3 degrees from the designed angles, sufficient performance corresponding to a half-wave plate contrast ratio of at least 100:1 is achieved.

Accordingly, if the polarization corrector of the present invention is obtained by arranging two half-wave plates in series on the optical path, the first half-wave plate is preferably disposed such that the slow or fast axis thereof defines an angle of about 30.8 degrees to about 36.8 degrees either dextrorotatorily or levorotatorily with respect to the vertical direction on the screen (i.e., shifting direction). The second half-wave plate is preferably disposed such that the slow or fast axis thereof defines an angle of about 8.3 degrees to about 14.3 degrees either dextrorotatorily or levorotatorily with respect to the vertical direction on the screen. Then, the intended effects are achieved fully. In other words, the first half-wave plate is preferably disposed such that the slow or fast axis thereof defines an angle of about 8.3 degrees to about 14.3 degrees either dextrorotatorily or levorotatorily with respect to the polarization axis of the light ray that has gone out of the display panel. On the other hand, the second half-wave plate is preferably disposed such that the slow or fast axis thereof defines an angle of about 30.8 degrees to about 36.8 degrees either dextrorotatorily or levorotatorily with respect to the polarization axis of the light ray that has gone out of the display panel.

Japanese Laid-Open Publication No. 7-5421 discloses an exemplary arrangement including multiple half-wave plates. However, those half-wave plates are disposed to form a predetermined tilt angle, and cannot be stacked one upon the other. Furthermore, the method disclosed in this publication No. 7-5421 is a method of converting an elliptically polarized light ray into a linearly polarized light ray. Japanese Laid-Open Publication No. 11-298920 also discloses an exemplary arrangement including multiple half-wave plates. But that arrangement is designed to realize a 3D display. Thus, neither of these two documents discloses a design procedure to take in a situation where the R, G and B rays are incident at mutually different angles as in the embodiment described above or has the same object as the present invention.

Hereinafter, a third specific embodiment of the present invention will be described. The polarization corrector g0 for use in this third embodiment also includes the first half-wave plate and the second half-wave plate that are stacked in this order such that the first half-wave plate receives the incoming light ray earlier than the second half-wave plate. The material and retardation value of these two half-wave plates may be the same as those adopted for the second embodiment described above. The only difference between the second and third embodiments lies in the slow-axis or fast-axis angles of the half-wave plates.

In the polarization corrector g0 of this embodiment, the slow axis or fast axis of the half-wave plate on the light incoming side preferably defines an angle of about 67.5 degrees with respect to the vertical direction on the screen. On the other hand, the slow axis or fast axis of the half-wave plate on the light outgoing side preferably defines an angle of about 135.0 degrees with respect to the vertical direction on the screen. In other words, the slow axis or fast axis of the half-wave plate on the light incoming side preferably defines an angle of about 22.5 degrees with the polarization axis of the incoming light ray, while the slow axis or fast axis of the half-wave plate on the light outgoing side preferably defines an angle of about 90.0 degrees with the polarization axis of the incoming light ray.

Figure 16:
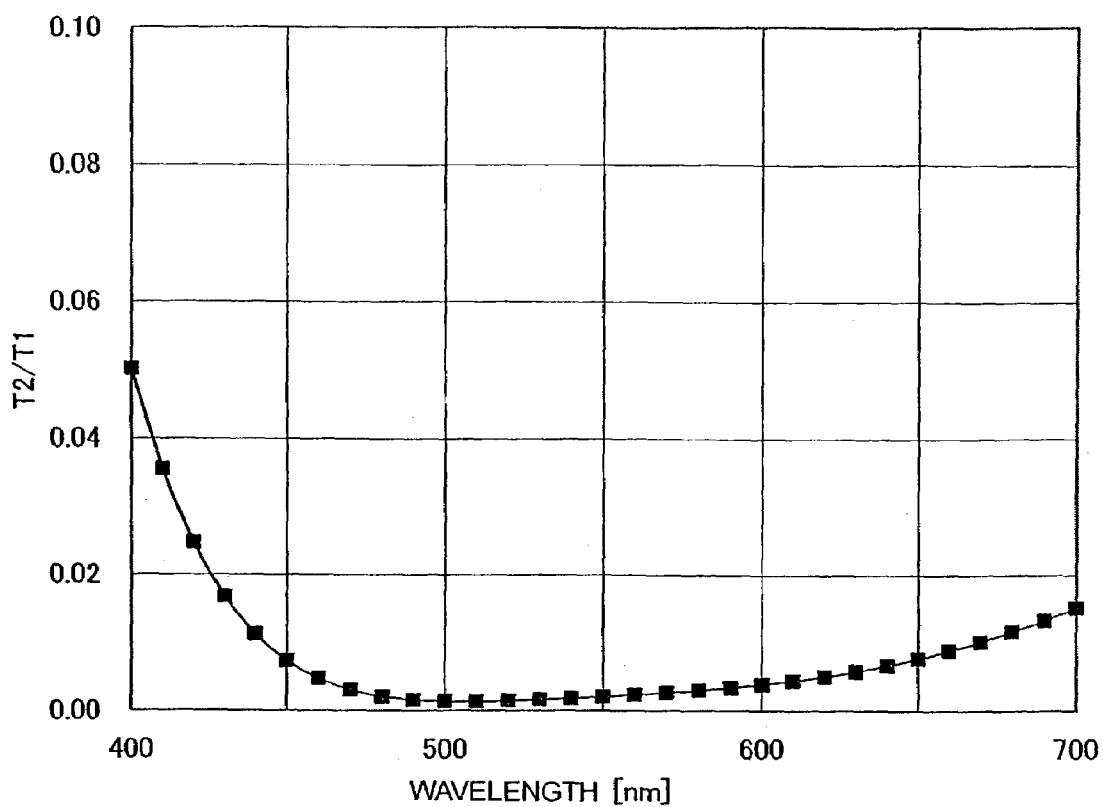
FIG. 16 is a graph showing how the quantity of light transmitted through two half-wave plates changes with the wavelength of the light in a third specific preferred embodiment of the present invention.

As in the first embodiment described above, a pair of polarizers was disposed on the light incoming side and light outgoing side of the polarization corrector g0 such that their transmission axes defined an angle of about 45 degrees and an angle of about 0 degrees with the vertical direction, respectively The quantity of light transmitted was measured for such an arrangement. The results are shown in FIG. 16. As can be seen from FIG. 16, only the ordinary ray component (or the extraordinary ray component) entered the birefringent element (of quartz) of the optical shifter particularly around the center wavelength of G ray of about 550 nm.

Figure 17:
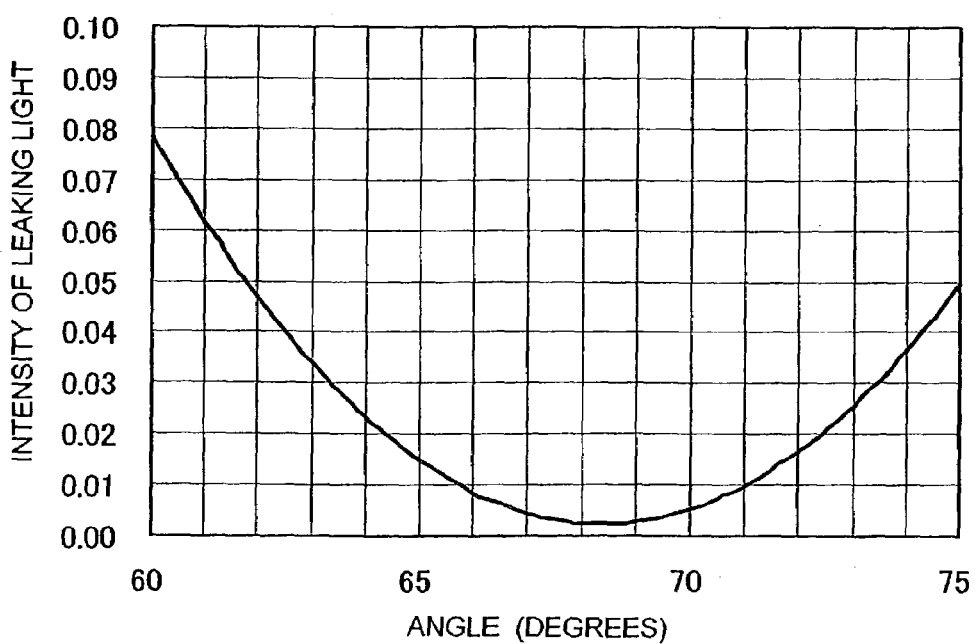
FIG. 17 is a graph showing how the quantity of leaking light changes with the slow-axis or fast-axis angle of the first one of the two half-wave plates.
Figure 18:
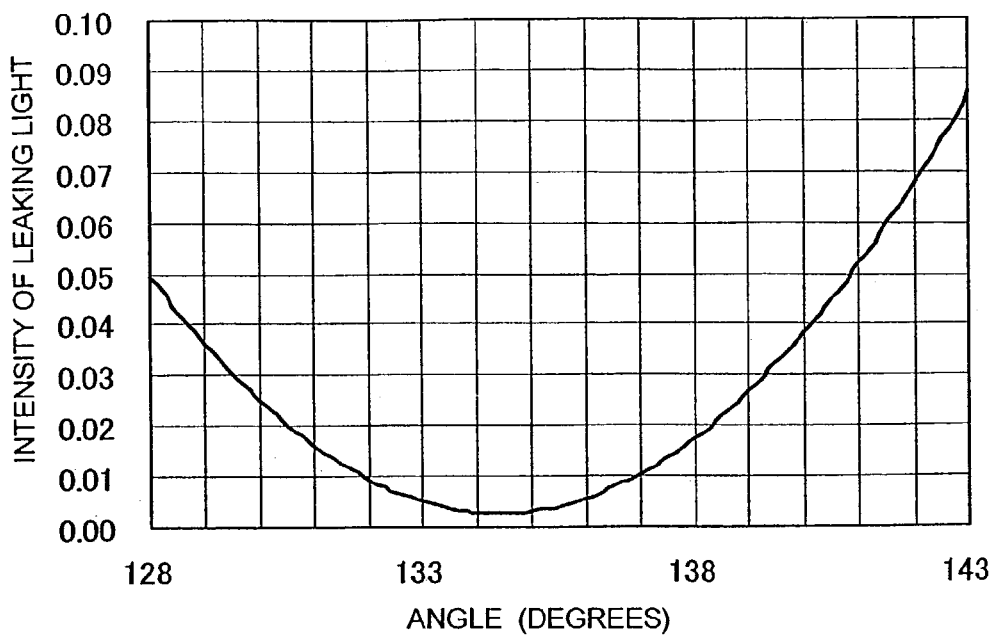
FIG. 18 is a graph showing how the quantity of leaking light changes with the slow-axis or fast-axis angle of the second one of the two half-wave plates.

The two half-wave plates of the polarization corrector g0 do not have to be arranged as described above. For example, as in the second embodiment described above, two polarizers may be disposed on the light incoming side and light outgoing side of two half-wave plates, which are not stacked but arranged in series on the optical path, such that their transmission axes respectively define an angle of about 45 degrees and an angle of about 0 degrees with the vertical direction on the screen. With the slow-axis or fast-axis angles of the first and second half-wave plates changed, the quantity of light transmitted was measured. The results are shown in FIGS. 17 and 18. Specifically, FIG. 17 shows the quantity of light leaking when the slow-axis or fast-axis angle of the first half-wave plate was changed, while FIG. 18 shows the quantity of light leaking when the slow-axis or fast-axis angle of the second half-wave plate was changed. As can be seen from FIGS. 17 and 18, if the slow-axis or fast-axis angles of the half-wave plates are within ±3 degrees from the designed angles, sufficient performance corresponding to a half-wave plate contrast ratio of at least 100:1 is achieved.

Embodiment 3

Hereinafter, a third specific preferred embodiment of the present invention will be described. The polarization corrector g0 for use in this third preferred embodiment also includes the first half-wave plate and the second half-wave plate that are stacked in this order such that the first half-wave plate receives the incoming light ray earlier than the second half-wave plate. The material and retardation value of these two half-wave plates may be the same as those adopted for the second preferred embodiment described above. The only difference between the second and third preferred embodiments lies in the slow-axis or fast-axis angles of the half-wave plates.

In the polarization corrector g0 of this preferred embodiment, the slow axis or fast axis of the half-wave plate on the light incoming side preferably defines an angle of about 67.5 degrees with respect to the vertical direction on the screen.

On the other hand, the slow axis or fast axis of the half-wave plate on the light outgoing side preferably defines an angle of about 135.0 degrees with respect to the vertical direction on the screen. In other words, the slow axis or fast axis of the half-wave plate on the light incoming side preferably defines an angle of about 22.5 degrees with the polarization axis of the incoming light ray, while the slow axis or fast axis of the half-wave plate on the light outgoing side preferably defines an angle of about 90.0 degrees with the polarization axis of the incoming light ray.

As in the first preferred embodiment described above, a pair of polarizers was disposed on the light incoming side and light outgoing side of the polarization corrector g0 such that their transmission axes defined an angle of about 45 degrees and an angle of about 0 degrees with the vertical direction, respectively. The quantity of light transmitted was measured for such an arrangement. The results are shown in FIG. 16. As can be seen from FIG. 16, only the ordinary ray component (or the extraordinary ray component) entered the birefringent element (of quartz) of the optical shifter particularly around the center wavelength of G ray of about 550 nm.

The two half-wave plates of the polarization corrector g0 do not have to be arranged as described above. For example, as in the second preferred embodiment described above, two polarizers may be disposed on the light incoming side and light outgoing side of two half-wave plates, which are not stacked but arranged in series on the optical path, such that their transmission axes respectively define an angle of about 45 degrees and an angle of about 0 degrees with the vertical direction on the screen. With the slow-axis or fast-axis angles of the first and second half-wave plates changed, the quantity of light transmitted was measured. The results are shown in FIGS. 17 and 18. Specifically, FIG. 17 shows the quantity of light leaking when the slow-axis or fast-axis angle of the first half-wave plate was changed, while FIG. 18 shows the quantity of light leaking when the slow-axis or fast-axis angle of the second half-wave plate was changed. As can be seen from FIGS. 17 and 18, if the slow-axis or fast-axis angles of the half-wave plates are within ±3 degrees from the designed angles, sufficient performance corresponding to a half-wave plate contrast ratio of at least 100:1 is achieved.

Accordingly, if the polarization corrector of the present invention is obtained by arranging two half-wave plates in series on the optical path, the first half-wave plate is preferably disposed such that the slow or fast axis thereof defines an angle of about 64.5 degrees to about 70.5 degrees either dextrorotatorily or levorotatorily with respect to the vertical direction on the screen. The second half-wave plate is preferably disposed such that the slow or fast axis thereof defines an angle of about 132.0 degrees to about 138.0 degrees either dextrorotatorily or levorotatorily with respect to the vertical direction on the screen. Then, the intended effects are achieved fully. In other words, the first half-wave plate is preferably disposed such that the slow or fast axis thereof defines an angle of about 19.5 degrees to about 25.5 degrees either dextrorotatorily or levorotatorily with respect to the polarization axis of the light ray that has gone out of the display panel. On the other hand, the second half-wave plate is preferably disposed such that the slow or fast axis thereof defines an angle of about 87.0 degrees to about 93.0 degrees either dextrorotatorily or levorotatorily with respect to the polarization axis of the light ray that has gone out of the display panel.

Figure 19:
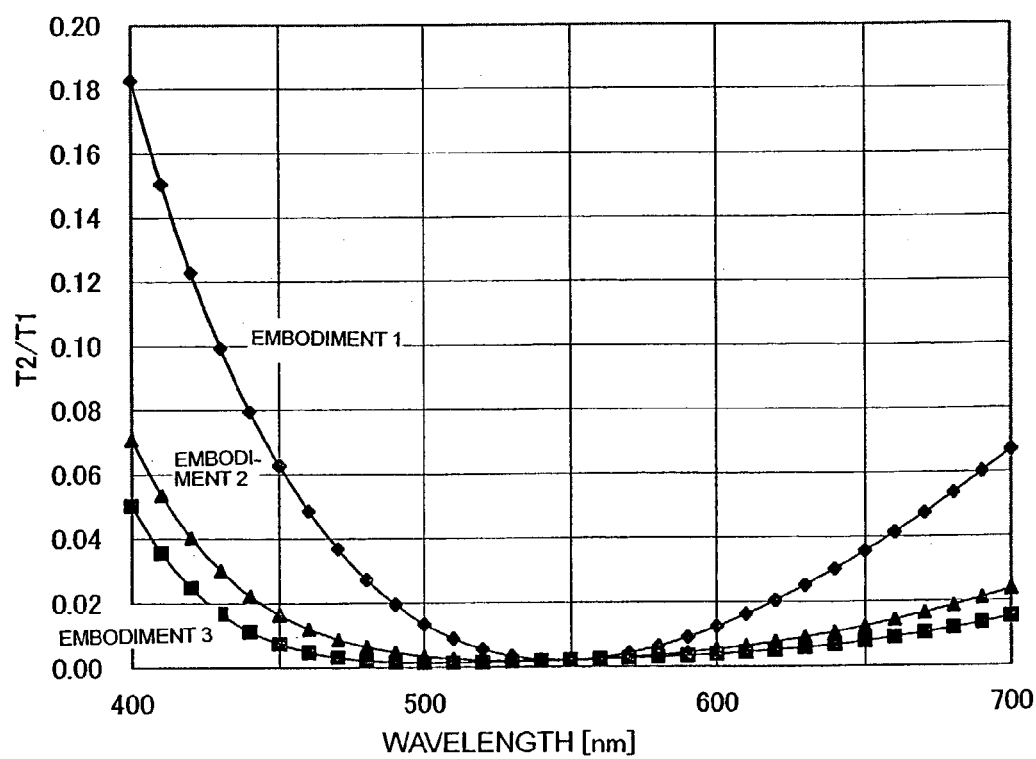
FIG. 19 is a graph showing how the quantity of light transmitted through one or two half-wave plates changes with the wavelength of the light in the first, second and third embodiments.

Next, the polarization correctors of the first, second and third embodiments described above will be compared to each other with reference to FIG. 19. The quantity of leaking light was measured with two polarizers disposed on the light incoming side and light outgoing side of each of the polarization correctors of the first through third embodiments described above such that their transmission axes defined an angle of about 45 degrees and an angle of about 0 degrees, respectively, with respect to the shifting direction. FIG. 19 shows how the quantity of leaking light changed with the wavelength of the incoming light in the polarization correctors of the first, second and third embodiments.

As can be seen from FIG. 19, the polarization corrector of the second or third embodiment can provide an appropriately directed, polarized light ray for the birefringent element of the optical shifter in a broader wavelength range than the polarization corrector of the first embodiment. Thus, the polarization corrector as the stack of two half-wave plates may be regarded as working better than the polarization corrector consisting of just one half-wave plate. However, rather good effects are also achievable even by the polarization corrector consisting of only one half-wave plate. Thus, to cut down the cost, the polarization corrector may include just one half-wave plate.

Figure 20:
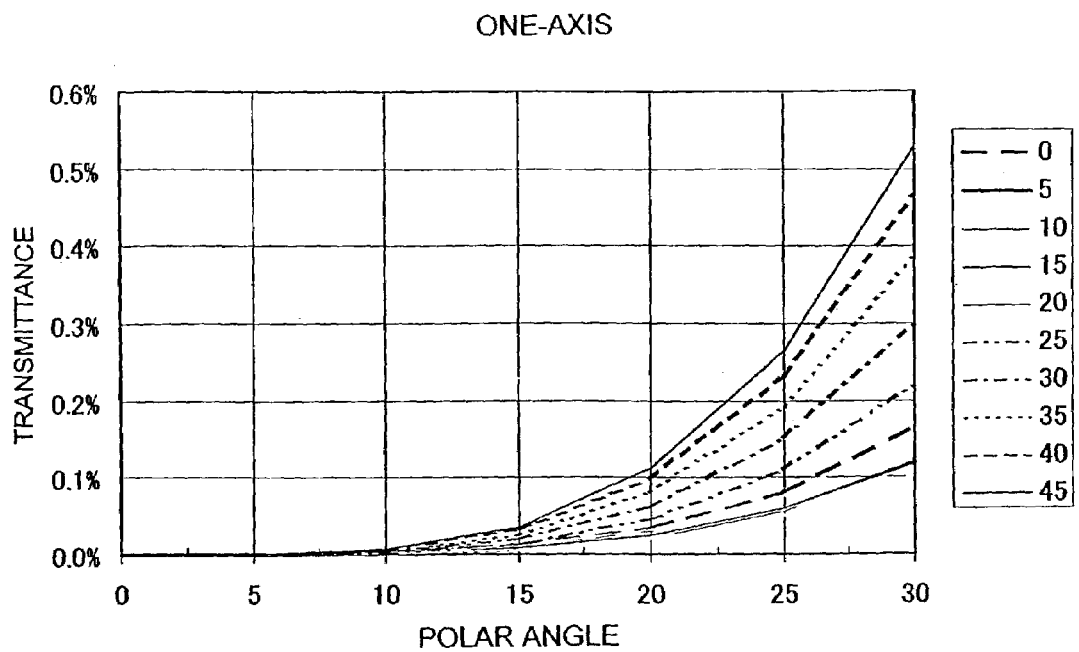
FIG. 20 is a graph showing how the quantity of light transmitted changes with the polar angle in a situation where two polarizers are disposed on the light incoming side and light outgoing side of the polarization corrector of the first, second or third embodiment such that their transmission axes respectively define about 45 degrees and about 0 degrees with respect to the shifting direction.

Hereinafter, a fourth specific embodiment of the present invention will be described. In this embodiment, the quantity of light transmitted was measured with two polarizers disposed on the light incoming side and light outgoing side of the polarization corrector of any of the embodiments described above such that their transmission axes defined an angle of about 45 degrees and an angle of about 0 degrees, respectively, with the shifting direction (i.e., the vertical direction on the screen). FIG. 20 shows how the transmittance (i.e., the quantity of light transmitted) changed with the polar angle, i.e., the angle defined by the optical axis of the incoming light ray with a normal to the half-wave plate. A number of curves shown in FIG. 20 are associated with mutually different azimuths at which the incoming light ray was incident onto the half-wave plate. In the example shown in FIG. 20, the zero o'clock direction (or vertical direction) on a plane of the half-wave plate is supposed to have an azimuth of 0 degrees and the three o'clock direction (or horizontal direction) on the plane is supposed to have an azimuth of 90 degrees.

As can be seen from FIG. 20, the greater the polar angle, the greater the quantity of light transmitted. In other words, the greater the tilt angle defined by the incoming light ray with the surface of the half-wave plate, the greater the quantity of leaking light that might deteriorate the image quality. Such increase in the quantity of light transmitted was particularly steep when the azimuth was about 45 degrees.

In the embodiment shown in FIG. 1, the white light emitted is split into three light rays in the three primary colors by the dichroic mirrors. Accordingly, the R, G and B light rays are incident onto the half-wave plate at mutually different angles. In addition, the light ray in each of the three primary colors is not a completely parallel ray, and is incident onto the half-wave plate with a polar angle variation of almost 20 degrees. In this embodiment, however, a half-wave plate having little angular dependence is used to prevent a light ray having an unwanted polarization direction from entering the optical shifter. Thus, no ghost image is produced and the image quality does not deteriorate.

Figure 23:
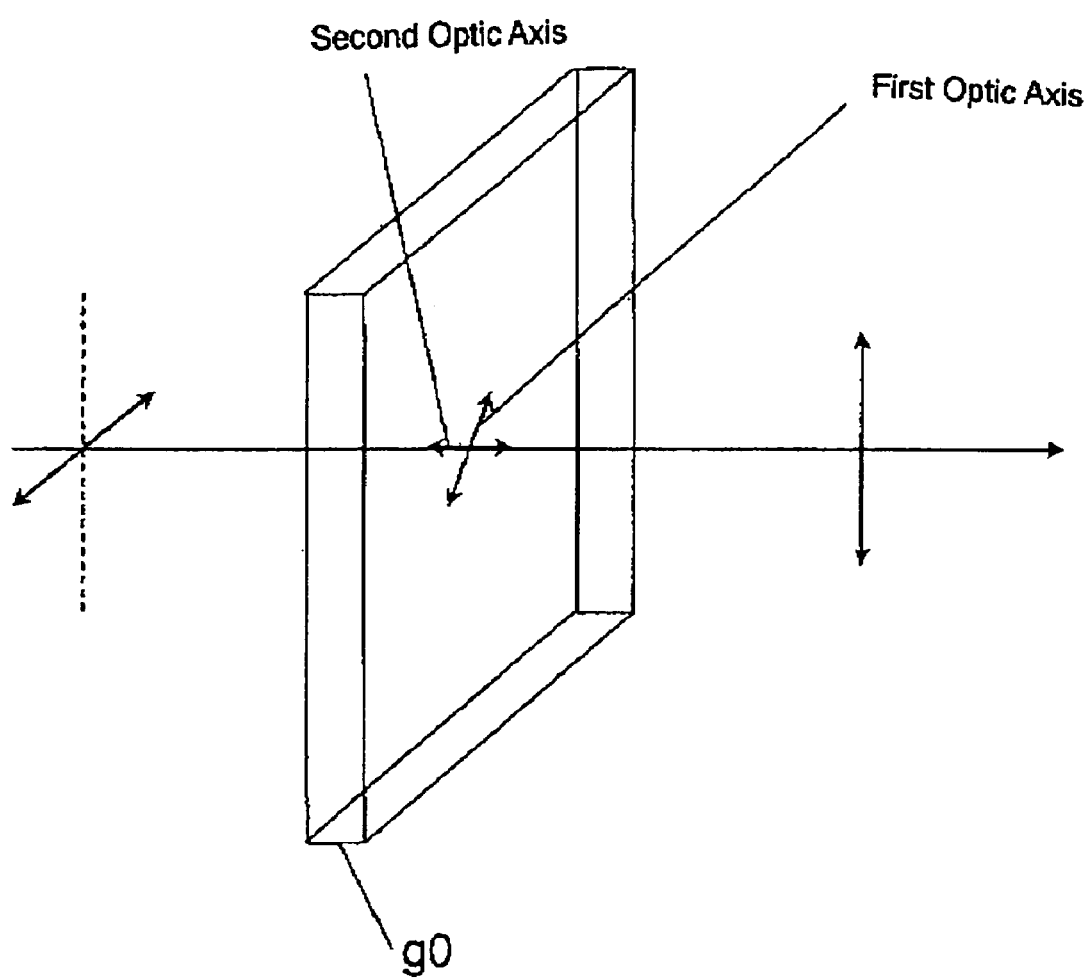
FIG. 23 is a polarization corrector having a first optic axis and a second optic axis.

As shown in FIG. 23, a half-wave plate g0 having two optic axes may be used as the half-wave plate having little angular dependence. If refractive indices nx and ny in two mutually perpendicular directions on a plane of the half-wave plate satisfy the relationship nx>ny, then the two-axis half-wave plate preferably has a refractive index difference represented by (nx+ny)/2=nz in the thickness direction. When the refractive indices nx and ny satisfy this relationship, (nx+ny)/2−nz=0. Accordingly, no phase difference is created in the thickness direction of the half-wave plate, and a half-wave plate having little angular dependence is realized. It should be noted that even if (nx+ny)/2−nz is not quite equal to zero but approximately zero, desired effects are also achieved. For example, to realize a contrast ratio of 100:1 in a polar angle range of a lens having an F value of about 1.7, (nx+ny)/2−nz is preferably no greater than about ±0.2% of (nx+ny)/2.

Figure 21:
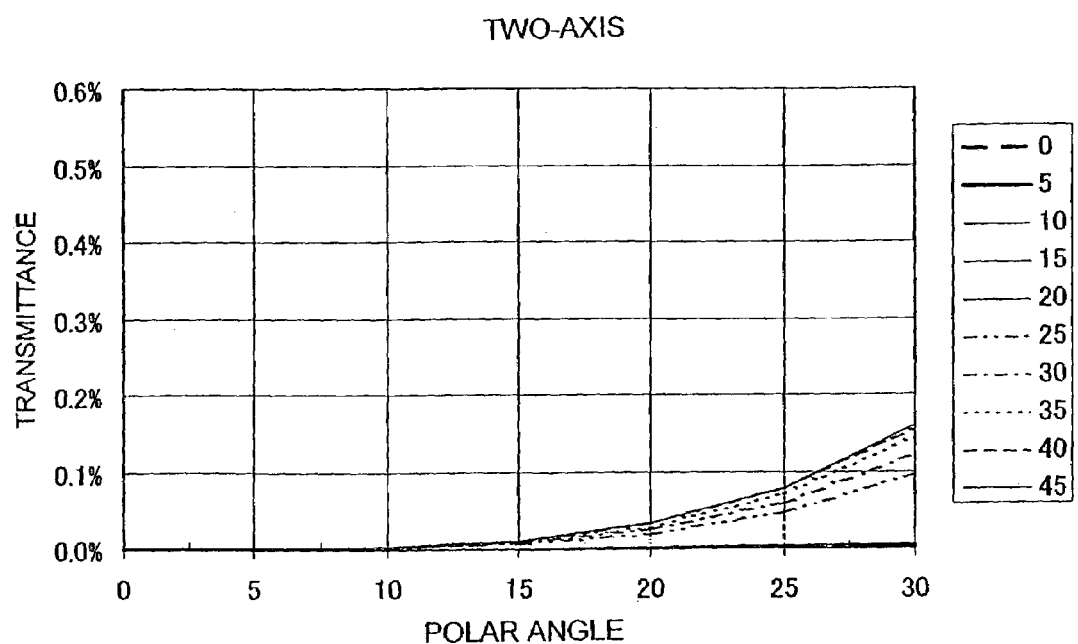
FIG. 21 is a graph showing how the quantity of light transmitted changes with the polar angle in a situation where two polarizers are disposed on the light incoming side and light outgoing side of the polarization corrector of a fourth specific embodiment such that their transmission axes respectively define about 45 degrees and about 0 degrees with respect to the shifting direction.

The quantity of light transmitted was measured with two polarizers disposed on the light incoming side and light outgoing side of the polarization corrector such that their transmission axes defined an angle of about 45 degrees and an angle of about 0 degrees with the shifting direction. FIG. 21 shows the angular dependence of the quantity of light transmitted (i.e., transmittance).

Comparing the results shown in FIGS. 20 and 21 with each other, it can be seen that the angular dependence can be reduced by using the two-axis half-wave plate. Even if the polarization corrector consists of just one such half-wave plate having two axes, the polarization corrector has little angular dependence and functions sufficiently properly in practice. When the number of half-wave plates to be provided can be reduced, the equipment cost can be cut down effectively. Thus, by using just one two-axis half-wave plate as the polarization corrector, the equipment cost can be reduced without deteriorating the image quality.

According to various embodiments of the present invention described above, even if the polarization axis of the outgoing light ray of a display panel is neither parallel to, nor perpendicular to, the direction in which the optical path of the outgoing light ray is shifted time-sequentially synchronously with the switching of image components to be displayed, the image can still be shifted just as intended due to the function of the polarization corrector. Thus, the present invention provides an optical display system that realizes the display of a bright and uniform image at a high resolution and that can effectively contribute to size and cost reduction.

While the present invention has been described with respect to embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An optical shifter for periodically shifting an optical path of an outgoing light ray of a display panel, which represents an image frame, and thereby selectively displacing the image frame to one of three or more locations that are arranged in line on the same plane and that are spaced apart from each other by at least one pixel pitch, the optical shifter comprising:

at least two pairs of elements that are arranged in series on the optical path of the outgoing light ray, each of said pair including a first element and a second element, which are arranged in this order such that the first element is closer to the display panel than the second element, the first element selectively changing a polarization direction of the outgoing light ray of the display panel, and the second element exhibiting one of multiple different refractive indices according to the polarization direction of incoming light; and a polarization corrector, which is disposed between the display panel and the first element that is closer to the display panel than any of the elements of the at least two pairs and which changes the polarization direction of the outgoing light ray of the display panel, the polarization direction being neither parallel to, nor perpendicular to, a direction in which the optical path is shifted, into a direction that is either parallel to, or perpendicular to, a direction in which the optical path is shifted.

2. The optical shifter of claim 1, wherein the polarization corrector includes at least one half-wave plate.

3. The optical shifter of claim 1, wherein the polarization corrector includes multiple half-wave plates that are arranged in series on the optical path.

4. An optical shifter of claim 3, wherein the polarization corrector includes a first half-wave plate and a second half-wave plate, which are arranged in this order such that the first half-wave plate is closer to the display panel than the second half-wave plate, wherein the first half-wave plate has a slow axis or fast axis that defines an angle of about 30.8 degrees to about 36.8 degrees either dextrorotatorily or levorotatorily with respect to the direction in which the optical path will be shifted, and wherein the second half-wave plate has a slow axis or fast axis that defines an angle of about 8.3 degrees to about 14.3 degrees either dextrorotatorily or levorotatorily with respect to the direction in which the optical path will be shifted.

5. The optical shifter of claim 3, wherein the polarization corrector includes a first half-wave plate and a second half-wave plate, which are stacked in this order such that the first half-wave plate is closer to the display panel than the second half-wave plate, wherein the first half-wave plate has a slow axis or fast axis that defines an angle of about 64.5 degrees to about 70.5 degrees either dextrorotatorily or levorotatorily with respect to the direction in which the optical path will be shifted, and wherein the second half-wave plate has a slow axis or fast axis that defines an angle of about 132.0 degrees to about 138.0 degrees either dextrorotatorily or levorotatorily with respect to the direction in which the optical path will be shifted.

6. The optical shifter of claim 3, wherein the polarization corrector includes a half-wave plate having multiple optic axes.

7. The optical shifter of claim 1, wherein the polarization corrector includes a TN mode liquid crystal cell.

* * * * *